(12) United States Patent
Noguchi et al.

(10) Patent No.: US 7,236,307 B2
(45) Date of Patent: Jun. 26, 2007

(54) ZOOM OPTICAL SYSTEM AND IMAGING APPARATUS USING THE SAME

(75) Inventors: Azusa Noguchi, Hino (JP); Hisashi Goto, Tokyo-to (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/122,046

(22) Filed: May 5, 2005

(65) Prior Publication Data

US 2005/0259332 A1  Nov. 24, 2005

(30) Foreign Application Priority Data

May 19, 2004  (JP)  ............................. 2004-148594
May 19, 2004  (JP)  ............................. 2004-148595

(51) Int. Cl.
*G02B 15/14* (2006.01)

(52) U.S. Cl. ..................................... 359/687

(58) Field of Classification Search ................. 359/687
See application file for complete search history.

(56) References Cited

U.S. PATENT DOCUMENTS

| 6,950,247 B2 * | 9/2005 | Saruwatari | ................... 359/774 |
| 2002/0063970 A1 | 5/2002 | Uzawa et al. | |
| 2003/0197950 A1 | 10/2003 | Eguchi | |

FOREIGN PATENT DOCUMENTS

| JP | 2001-242379 | 9/2001 |
| JP | 2002-072087 | 3/2002 |

* cited by examiner

*Primary Examiner*—Ricky Mack
*Assistant Examiner*—William Choi
(74) *Attorney, Agent, or Firm*—Kenyon & Kenyon LLP

(57) ABSTRACT

A zoom optical system includes, in order from the object side, a first lens unit with positive refracting power, a second lens unit with negative refracting power, a third lens unit with positive refracting power, and a fourth lens unit with positive refracting power. An aperture stop is interposed between the second lens unit and the fourth lens unit. Upon zooming, at least, the first lens unit, the second lens unit, and the third lens unit are moved so that spacings between these lens units are varied. The first lens unit is constructed with at most two lens elements. The second lens unit includes, in order from the object side, a first negative lens in which the image-side surface is greater in curvature than the object-side surface, an air spacing, a second negative lens in which the image-side surface is greater in curvature than the object-side surface, an air spacing, and a positive lens in which the object-side surface is greater in curvature than the image-side surface. The second negative lens is constructed to satisfy the following condition:

$$-0.7 < f2/r23 < 0.05$$

where $r23$ is the radius of curvature of the object-side surface of the second negative lens and $f2$ is the focal length of the second lens unit.

35 Claims, 9 Drawing Sheets

SPHERICAL ABERRATION
FNO 2.823

-0.10  0.10

ASTIGMATISM
FIY 4.50

-0.10  0.10

DISTORTION
FIY 4.50

-5.00  5.00

CHROMATIC ABERRATION OF MAGNIFICATION
FIY 4.50

-0.01  0.01

SPHERICAL ABERRATION
FNO 3.393

-0.10  0.10

ASTIGMATISM
FIY 4.50

-0.10  0.10

DISTORTION
FIY 4.50

-5.00  5.00

CHROMATIC ABERRATION OF MAGNIFICATION
FIY 4.50

-0.01  0.01

SPHERICAL ABERRATION
FNO 4.802

-0.10  0.10

ASTIGMATISM
FIY 4.50

-0.10  0.10

DISTORTION
FIY 4.50

-5.00  5.00

CHROMATIC ABERRATION OF MAGNIFICATION
FIY 4.50

-0.01  0.01

546.07 ― ― ― ― 435.83 ― ― ― 486.13
― ― ― ― ― ― ― 656.27 ――――― 587.56

SPHERICAL
ABERRATION
FNO 2.835

ASTIGMATISM
FIY 4.50

DISTORTION
FIY 4.50

CHROMATIC
ABERRATION OF
MAGNIFICATION
FIY 4.50

SPHERICAL
ABERRATION
FNO 3.296

ASTIGMATISM
FIY 4.50

DISTORTION
FIY 4.50

CHROMATIC
ABERRATION OF
MAGNIFICATION
FIY 4.50

SPHERICAL
ABERRATION
FNO 4.655

ASTIGMATISM
FIY 4.50

DISTORTION
FIY 4.50

CHROMATIC
ABERRATION OF
MAGNIFICATION
FIY 4.50

546.07 ― ― ― ― 435.83 ― ・ ― 486.13
---------- 656.27 ―――― 587.56

SPHERICAL ABERRATION
FNO 2.841

ASTIGMATISM
FIY 4.50

DISTORTION
FIY 4.50

CHROMATIC ABERRATION OF MAGNIFICATION
FIY 4.50

SPHERICAL ABERRATION
FNO 3.405

ASTIGMATISM
FIY 4.50

DISTORTION
FIY 4.50

CHROMATIC ABERRATION OF MAGNIFICATION
FIY 4.50

SPHERICAL ABERRATION
FNO 4.793

ASTIGMATISM
FIY 4.50

DISTORTION
FIY 4.50

CHROMATIC ABERRATION OF MAGNIFICATION
FIY 4.50

546.07 ----- 435.83 ---- 486.13
-------- 656.27 ──── 587.56

SPHERICAL
ABERRATION

FNO 2.851

ASTIGMATISM

FIY 4.50

DISTORTION

FIY 4.50

CHROMATIC
ABERRATION OF
MAGNIFICATION

FIY 4.50

SPHERICAL
ABERRATION

FNO 3.295

ASTIGMATISM

FIY 4.50

DISTORTION

FIY 4.50

CHROMATIC
ABERRATION OF
MAGNIFICATION

FIY 4.50

SPHERICAL
ABERRATION

FNO 4.805

ASTIGMATISM

FIY 4.50

DISTORTION

FIY 4.50

CHROMATIC
ABERRATION OF
MAGNIFICATION

FIY 4.50

546.07 ----- 435.83 ----- 486.13
-------- 656.27 ———— 587.56

ZOOM OPTICAL SYSTEM AND IMAGING APPARATUS USING THE SAME

This application claims benefits of Japanese Application Nos. 2004-148594 filed in Japan on May 19, 2004 and 2004-148595 filed in Japan on May 19, 2004, the contents of which are hereby incorporated by reference.

BACKGROUND OF THE INVENTION

1. Field of the Invention

This invention relates to a zoom optical system suitable for forming an image of an object on an electronic image sensor, such as a CCD or C-MOS, and to an imaging apparatus using the zoom optical system.

2. Description of Related Art

Recently, in an electronic still camera using the electronic image sensor, such as the CCD or C-MOS, it has been required to further improve its wide angle, high variable magnification ratio, and high image quality. In particular, the demand on the high image quality has been increased with respect to a movie camera.

In the case of a lens suitable for the electronic image sensor such as the CCD or C-MOS, it is required that the exit pupil is relatively spaced away from the image plane.

This requirement does not generally constitute an obstacle even though other elements corresponding to image sensors (for example, a silver-halide film and the like) are used.

Such problems have been discussed by proposals such as those disclosed, for example, in Japanese Patent Kokai Nos. 2001-242379, 2003-315676, 2002-72087, and 2002-62478.

SUMMARY OF THE INVENTION

The zoom optical system according to an aspect of the present invention comprises, in order from the object side, a first lens unit with positive refracting power, a second lens unit with negative refracting power, a third lens unit with positive refracting power, and a fourth lens unit with positive refracting power. An aperture stop is interposed between the second lens unit and the fourth lens unit. Upon zooming, at least, the first lens unit, the second lens unit, and the third lens unit are moved so that spacings between these lens units are varied. The first lens unit is constructed with at most two lens elements. The second lens unit includes, in order from the object side, a first negative lens in which the image-side surface is greater in curvature than the object-side surface, an air spacing, a second negative lens in which the image-side surface is greater in curvature than the object-side surface, an air spacing, and a positive lens in which the object-side surface is greater in curvature than the image-side surface. The second negative lens is constructed to satisfy the following condition:

$$-0.7 < f2/R23 < 0.05 \quad (1)$$

where R23 is the radius of curvature of the object-side surface of the second negative lens and f2 is the focal length of the second lens unit.

The zoom optical system according to another aspect of the present invention comprises, in order from the object side, a first lens unit with positive refracting power, a second lens unit with negative refracting power, a third lens unit with positive refracting power, and a fourth lens unit with positive refracting power. An aperture stop is interposed between the second lens unit and the fourth lens unit. Upon zooming, at least, the first lens unit, the second lens unit, and the third lens unit are moved so that spacings between these lens units are varied. The first lens unit is constructed with at most two lens elements, and the focal length of the whole zoom optical system can be changed at least 3.5 times. In this case, the zoom optical system satisfies the following condition:

$$1.8 < (Tt-Tw)/fw < 6$$

where Tw is the total length of the zoom optical system at a wide-angle position, Tt is the total length of the zoom optical system at a telephoto position and refers to a distance from a first surface of the zoom optical system to an image plane, and fw is the focal length of the zoom optical system at the wide-angle position.

The imaging apparatus according to the present invention comprises the zoom optical system mentioned above.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
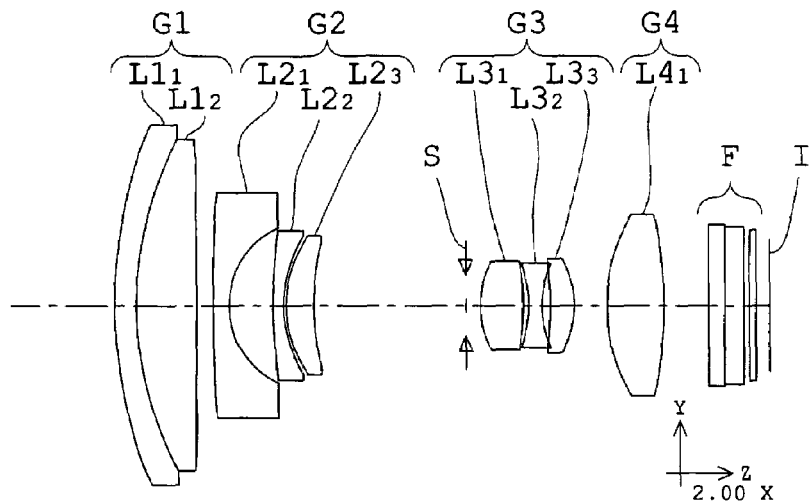
FIGS. 1A, 1B, and 1C are sectional views showing lens arrangements, developed along the optical axis, at wide-angle, middle, and telephoto positions, respectively, of a first embodiment of the zoom optical system according to the present invention.

Before undertaking the description of the embodiments, the function and effect of the present invention will be explained.

According to the present invention, the spacing between the first lens unit with positive power and the second lens unit with negative power and the spacing between the second lens unit with negative power and the third lens unit with positive power are changed, and variable magnification functions are imparted to at least the first, second, and third lens units. Whereby, it becomes possible to achieve a high variable magnification ratio while suppressing the degradation of image quality. The aperture stop is interposed between the second lens unit and the fourth lens unit, and the fourth lens unit is constructed as a positive lens unit. Whereby, even in a wide-angle design, a reduction of the diameter of the first lens unit is particularly compatible with the exit pupil suitable for the electronic image sensor. A distance between the fourth lens unit and the image plane is made constant or variable, and the spacing between the third lens unit and the fourth lens unit is adjusted. Whereby, the position of the image plane is kept constant and the position of the exit pupil can be held within a proper limit.

In this case, because of a reduction of the total length and downsizing of the first lens unit (which is larger in diameter than any of the other lens units), it becomes easy that the object-side surface of the first lens unit approaches the aperture stop. The spacing between the first lens unit and the second lens unit is considerably changed and thereby the variable magnification ratio can be increased.

In the present invention, the first lens unit is constructed with no more than two lenses to reduce its entire length so that Condition (1) is satisfied. Thus, the amount of change of the spacing between the first lens unit and the second lens unit is ensured. That is, the first lens unit has the large diameter in order to achieve a wide angle of view and to ensure brightness at the telephoto position, and hence there is the need to increase the thicknesses of the middle and edge of a lens because of lens fabrication. As such, in the case where the first lens unit is constructed with one or two lenses and the number of lenses of each of the other lens units is increased, the entire length of each lens unit can be made shorter than in the case where the first lens unit is constructed with three or more lenses. As a result, the degradation of optical performance is suppressed and the object-side surface of the first lens unit approaches the aperture stop at the wide-angle position.

The principal point of the second lens unit is located on the object side and thereby a distance between the principal points of the first lens unit and the second lens unit is easily reduced at the wide-angle position. This is effective for an increase of the variable magnification ratio or a reduction of the diameter of a front lens (the diameter of the object-side surface of the first lens unit). In the arrangement of the second lens unit, it is favorable that the negative lens is placed on the object side and the positive lens is placed on the image side in order to correct aberrations (in particular, such as curvature of field, coma, and distortion). The second lens unit includes the first negative lens in which the image-side surface has greater curvature than the object-side surface, the second negative lens in which the image-side surface has greater curvature than the object-side surface, and the positive lens in which the object-side surface has greater curvature than the image-side surface, and thereby the principal point of the second lens unit can be located on the object side.

Furthermore, air spacings are provided between the first negative lens and the second negative lens and between the second negative lens and the positive lens. By satisfying Condition (1), it becomes easy to balance low-order aberration and high-order aberration, particularly with respect to an off-axis light beam in a wide-angle region, and to ensure the imaging performance of an on-axis light beam in the range from the wide-angle position to the telephoto position.

Beyond the upper limit of Condition (1), considerable high-order aberration is produced and the control of the position of the principal point in the second lens unit becomes difficult. Below the lower limit, the smallest high-order aberration is produced and in particular, correction for coma becomes difficult as the entire system. Also, as the absolute value of the radius of curvature, measured along the optical axis, is decreased, the curvature becomes great. The lower limit of Condition (1) may be set to −0.6 or −0.55. Alternatively, the upper limit may be set to 0 or −0.01.

In the zoom optical system according to the present invention, it is desirable that the object-side surface of the first negative lens is configured as an aspherical surface and the optical system satisfies the following condition:

$$0 < \Phi L1/\Phi H1 < 1.3 \qquad (2)$$

where $\Phi L1$ is the amount of deviation, measured along the optical axis, from a reference spherical surface of a diameter −0.30 times the focal length of the second lens unit to the aspherical surface and $\Phi H1$ is the amount of deviation, measured along the optical axis, from a reference spherical surface of a diameter −0.75 times the focal length of the second lens unit to the aspherical surface. Here, the reference spherical surface refers to a spherical surface coming in contact with the vertex of the aspherical surface and having curvature at the vertex of the aspherical surface. In other words, the radius of the reference spherical surface is identical to the radius of curvature of the aspherical surface, measured along the optical axis.

By satisfying Condition (2), the degradation of performance of the off-axis light beam at the wide-angle position is easily suppressed, and a lens system whose total length is reduced by the arrangement of the first lens unit composed of at most two lens elements can be constructed.

Below the lower limit of Condition (2), the position of the principal point is liable to be shifted to the image side.

Beyond the upper limit, the production of aberration (for example, high-order aberration) of the off-axis light beam at the wide-angle position becomes considerable, and as a result, it becomes difficult to keep favorable imaging performance.

The lower limit of Condition (2) may be set to 0.02 or 0.04, and the upper limit may be set to 0.9 or 0.2.

In the zoom optical system according to the present invention, it is favorable that the aperture stop is placed on the object side of the third lens unit. By doing so, it becomes easy to suitably suppress the oversizing of the diameter of the first lens unit and at the same time, to space away the position of the exit pupil from the image plane appropriately.

It is desirable that the aperture stop and the second lens unit are moved individually. Whereby, the adjustment of the position of the exit pupil caused by the shift of the position of the stop becomes easy. It is also desirable that the aperture stop is moved integrally with the third lens unit. By doing so, the structure of a lens frame can be simplified.

In the zoom optical system according to the present invention, it is desirable that third lens unit includes, in order from the object side, a positive lens, an air spacing, a negative lens, an air spacing, and a positive lens. Whereby, even with a small number of lenses, correction for aberration of the third lens unit becomes easy and the stabilization of imaging performance can be facilitated. It is also desirable that the third lens unit includes a biconvex positive lens, the air spacing, a biconcave negative lens, the air spacing, and a positive lens in which the image-side surface is greater in curvature than the object-side surface. By doing so, the balance between high- and low-order aberrations is easily held.

In the zoom optical system according to the present invention, it is desirable that the second lens unit is moved along a locus that is convex toward the image side within a variable magnification region between the wide-angle position and the telephoto position, while the first lens unit is moved to be located in an object-side position at the telephoto position with respect to at the wide-angle position. Whereby, the second lens unit is burdened with the load of zooming at the wide-angle position and is moved toward the object side at the telephoto position, so that interference with the third lens unit is easily obviated. The space for moving the third lens unit is easily ensured and the total length at the wide-angle position can be kept small. This is advantageous for the design of a high magnification ratio. The movement of these two lens units serves to reduce the diameter of the front lens (the diameter of the entrance surface of the first lens unit), facilitates the imposition of the load of zooming upon each of the second and third lens units, and is effective for an increase of the variable magnification ratio.

According to the present invention, it is desirable that the zoom optical system is constructed so that the first lens unit is always moved toward the object side upon zooming from the wide-angle position to the telephoto position. Whereby, it becomes easy to impose the variable magnification function on the second lens unit, which is advantageous for the attainment of a reduction of the total length at the wide-angle position and the high variable magnification ratio.

According to the present invention, it is desirable that the zoom optical system is constructed so that the third lens unit is always moved toward the object side upon zooming from the wide-angle position to the telephoto position. Whereby, it becomes easy to impose a heavy load of the zooming on the third lens unit, to reduce the load of the zooming of the second lens unit, and to simplify the arrangement of the first lens unit.

According to the present invention, it is desirable that upon zooming from the wide-angle position to the telephoto position, the spacing between the first lens unit and the second lens unit is widened, the spacing between the second lens unit and the third lens unit is narrowed, the spacing between the third lens unit and the fourth lens unit is widened, and the third lens unit is moved to be located in an object-side position at the telephoto position with respect to at the wide-angle position. Whereby, effects of the second, third, and fourth lens units upon zooming can be well balanced, and these effects can be further heightened. It is further desirable to satisfy the following condition:

$$0.4 < \Delta 13/fw < 1.2 \quad (3)$$

where fw is a focal length at the wide-angle position and $\Delta 13$ is the amount of change of the spacing between the first lens unit and the third lens unit at the telephoto position relative to the wide-angle position.

Below the lower limit of Condition (3), it becomes difficult to have a satisfactory variable magnification ratio. Beyond the upper limit, the total length is liable to increase at the telephoto position. Moreover, where the amount of marginal light at the telephoto position is ensured, the diameter of the front lens tends to enlarge. The lower limit of Condition (3) may be set to 0.5 or 0.55, or the upper limit may be set to 1.0 or 0.9.

In the zoom optical system according to the present invention, it is desirable that the second lens unit is moved along a locus that is convex toward the image side so as to take a more object-side position at the telephoto position than at the wide-angle position, while the first lens unit is moved to take a more object-side position at the telephoto position than at the wide-angle position, satisfying the following condition:

$$0.6 < ST/(Tt-Tw) < 1.1 \quad (4)$$

where Tt is the total length of the zoom optical system (a distance from the first surface to the image plane) at the telephoto position, Tw is the total length of the zoom optical system (a distance from the first surface to the image plane) at the wide-angle position, ST is the amount of movement of the first lens unit ranging from the proximity of an intermediate focal length state to the telephoto position. Here, the intermediate focal length state refers to a state of a focal length expressed by the geometric means of the focal lengths at the wide-angle and telephoto positions in the zoom optical system, and its proximity refers to a state of any focal length within 12 percent of the intermediate focal length.

Condition (4) determines the amount of movement of the first lens unit ranging from the proximity of the intermediate focal length state to the telephoto position against the amount of movement of the first lens unit ranging from the wide-angle position to the telephoto position, (Tt−Tw). At the telephoto position, the height, from the optical axis, of a light beam incident on the second lens unit is relatively low, and hence even though the variable magnification function is enhanced, optical performance is little changed. The optical system is constructed as mentioned above so that the load of the magnification change of the second lens unit at the wide-angle position is not too heavy, while the first lens unit is considerably moved at the telephoto position so that the variable magnification function is imparted to the second lens unit. Whereby, the region of movement of the third lens unit is easily ensured, and the optical system is easily balanced between the loads of the zooming of the second and third lens units in various states of the zooming. This is advantageous for the design of a high variable magnification ratio.

Below the lower limit of Condition (4), the load of the zooming of the second lens unit at the wide-angle position becomes heavy, while, beyond the upper limit, the load of the zooming of the second lens unit at the wide-angle position becomes too light. The lower limit may be set to 0.7, preferably 0.75, or the upper limit may be 1.0, preferably 0.9.

If the amount of movement of the first lens unit ranging from the wide-angle position to the telephoto position is too large, a movement mechanism becomes complicated.

Thus, according to the present invention, it is desirable that the first lens unit satisfies the following condition:

$$0.2 < (Tt-Tw)/Tw < 0.8 \quad (5)$$

It is desirable that the amount of movement of the first lens unit ranging from the wide-angle position to the telephoto position, (Tt−Tw), is 0.2–0.8 times the total length of the lens system (the actual distance Tw between the entrance surface and the image plane) at the wide-angle position. Below the lower limit of Condition (5), the variable magnification function of the second lens unit is impaired, while, beyond the upper limit, the mechanical structure becomes complicated.

It is further desirable that the amount of movement of the first lens unit is 0.3–0.7 times. It is more desirable to be 0.4–0.6 times. Only one of the upper limit and the lower limit may be set.

According to the present invention, it is desirable that the fourth lens unit is constructed with a single positive lens element and is moved along the optical axis so that focusing can be performed. Whereby, a distance between the third lens unit and the image sensor at the wide-angle position can be diminished, and as a result, the length of the entire system can be reduced, which is favorable. In particular, when an arrangement is made such that no lens unit is interposed between the fourth lens unit and the image plane, the total length can be made shorter.

In the zoom optical system according to the present invention, it is desirable to satisfy the following condition:

$$1.8 < (Tt-Tw)/fw < 6 \quad (6)$$

where fw is the focal length of the zoom optical system at the wide-angle position, Tt is the total length of the zoom optical system at the telephoto position, and Tw is the total length of the zoom optical system (the distance from the first surface of the zoom optical system to an image plane) at the wide-angle position.

The object-side surface of the first lens unit approaches the aperture stop and thereby a further effect is produced on a reduction of the total length and downsizing of the first lens unit (which is larger in diameter than any of the other lens units). Moreover, the spacing between the first lens unit and the second lens unit is considerably changed and thereby the variable magnification ratio can be increased.

In this arrangement, the first lens unit is constructed with at most two lenses and the entire length of the first lens unit is reduced so as to satisfy Condition (6), thus ensuring the amount of change of the spacing between the first lens unit and the second lens unit. That is, since the first lens unit has the large diameter, there is the need to increase the thicknesses of the middle and edge of a lens because of lens fabrication. As such, in the case where the number of lenses of each of the other lens units is increased, the entire length of each lens unit can be made shorter than in the case where the first lens unit is constructed with three or more lenses. As a result, optical performance is not degraded and the object-side surface of the first lens unit approaches the aperture stop at the wide-angle position.

If the amount of movement is below the lower limit of Condition (6), it becomes difficult to ensure the amounts of changes of the spacings between the first lens unit and the second lens unit and between the second lens unit and the third lens unit. In addition, the positions of back principal points of the first to third lens units at the telephoto position are extremely shifted to the object side, and the lens arrangement of the optical system becomes difficult. Beyond the upper limit of Condition (6), the amount of movement of the first lens unit is so increased that the structure of a lens frame becomes difficult and an obstacle to compactness of the entire lens frame is constituted. Moreover, to ensure the optical path at the telephoto position, the outer diameter of the first lens unit must be increased, which is unfavorable. Alternatively, the refracting power of the first lens unit becomes too strong and it becomes difficult to correct aberration through the arrangement of the first lens unit constructed with one or two lenses. The optical system satisfies Condition (6) and Condition (3) simultaneously, thereby further enhancing the effect.

In the zoom optical system according to the present invention, it is desirable to satisfy the following condition:

$$3.4 < (Tt-Tw)/fw < 5 \quad (6')$$

Condition (6') provides a more favorable limit of Condition (6). Only the upper limit or only the lower limit of Condition (6) may be set. In addition, the lower limit may be set to 3.5 or the upper limit may be set to 4.5. Also, the length Tt may be 3.6–4 times or 3.7–4 times the length Tw.

According to the present invention, it is desirable that the first lens unit is such that spacing between the entrance surface and the exit surface of the first lens unit is filled with an optical material. The first lens unit is thus constructed so that air spacing is not provided in the first lens unit and thereby the production of flare light caused by reflection in the air spacing can be obviated. When the first lens unit is constructed with a cemented lens or a single lens, it becomes easy to suppress the production of flare or ghost. The first lens unit is preferably constructed with a cemented lens of a negative lens and a positive lens. Whereby, necessary refracting power is imparted to the first lens unit and at the same time, correction for aberration such as chromatic aberration is facilitated.

In the zoom optical system according to the present invention, it is desirable to satisfy the following condition:

$$1.5 < (en30/fw) < 5 \quad (7)$$

where en30 is the position of an entrance pupil relative to an angle of view of 30° at the wide-angle position.

If the value of en30/fw is below the lower limit of Condition (7), overlapping of an on-axis light beam and an off-axis light beam becomes so pronounced that it is difficult to ensure optical performance with a small number of lenses in the range from the center to the periphery of the image. Beyond the upper limit of Condition (7), the diameter of the first lens unit is increased and the compact design becomes difficult. Here, the position of the entrance pupil relative to an angle of view of 30° refers to a distance from the vertex of the object-side surface of the first lens unit to the point of intersection of the optical axis with an incident ray extension of an off-axis principal ray incident at an angle of 30° made with the optical axis.

In the zoom optical system according to the present invention, it is desirable to satisfy the following condition:

$$2 < (en30/fw) < 4 \tag{7'}$$

By satisfying this condition, the balance between optical performance and compactness is easily maintained. Also, only the lower limit of Condition (7) or only the upper limit may be set. In addition, the lower limit may be set to 2.3 or the upper limit may be set to 3.0.

In the zoom optical system according to the present invention, it is desirable to satisfy the following condition:

$$0.9 < (en35/en30) < 1.15 \tag{8}$$

where en35 is the position of the entrance pupil relative to an angle of view of 35° at the wide-angle position.

If the value of en35/en30 is below the lower limit of Condition (8), overlapping of a light beam relative to the angle of view of 30° and a light beam relative to the angle of view of 35° becomes pronounced at the first lens unit, and it becomes difficult to make an image quality at an angle of view of more than 30° favorably compatible with that at an angle of view of 30° or less in a small number of lenses. Beyond the upper limit of Condition (8), the diameter of the first lens unit is liable to enlarge. If these limits are exceeded, pupil aberration will be deteriorated and marginal light will be attenuated or imaging performance will be liable to be degraded. Also, the lower limit may be set to 0.95 or the upper limit may be set to 1.1.

In the zoom optical system according to the present invention, it is desirable that each of the second lens unit and the third lens unit is constructed with three lenses including a positive lens and a negative lens. In the zoom optical system according to the present invention, since the first lens unit has a small number of lenses, the load of the magnification change of each of the second lens unit and the third lens unit becomes heavy. Thus, in order to correct aberration in the second lens unit and the third lens unit, it is good practice to construct the optical system as mentioned above.

In the zoom optical system according to the present invention, it is desirable that the second lens unit is constructed with three lenses including a negative lens, a negative lens, and a positive lens, and the third lens unit is constructed with three lenses including two positive lenses and one negative lens. Whereby, each of the second lens unit and the third lens unit has a small number of lenses and at the same time, aberration is easily suppressed.

In the zoom optical system according to the present invention, it is desirable that the second lens unit includes, in order from the object side, a first negative lens in which the image-side surface is greater in curvature than the object-side surface, an air spacing, a second negative lens in which the image-side surface is greater in curvature than the object-side surface, an air spacing, and a positive lens in which the object-side surface is greater in curvature than the image-side surface, and the second negative lens satisfies the following condition:

$$-0.1 < R24/R23 < 0.5 \tag{9}$$

where R23 is the radius of curvature of the object-side surface of the second negative lens and R24 is the radius of curvature of the image-side surface of the second negative lens.

The principal point of the second lens unit is located on the object side and thereby a distance between the principal points of the first lens unit and the second lens unit is easily reduced at the wide-angle position. This is effective for an increase of the variable magnification ratio or a reduction of the diameter of a front lens (the diameter of the object-side surface of the first lens unit). In the arrangement of the second lens unit, it is favorable that the negative lens is placed on the object side and the positive lens is placed on the image side in order to correct aberrations (in particular, such as curvature of field, coma, and distortion). The second lens unit includes the first negative lens in which the image-side surface has greater curvature than the object-side surface, the second negative lens in which the image-side surface has greater curvature than the object-side surface, and the positive lens in which the object-side surface has greater curvature than the image-side surface, and thereby the principal point of the second lens unit can be located on the object side.

Furthermore, air spacings are provided between the first negative lens and the second negative lens and between the second negative lens and the positive lens. By satisfying Condition (9), it becomes easy to balance low-order aberration and high-order aberration, particularly with respect to an off-axis light beam in a wide-angle region, and to ensure the imaging performance of an on-axis light beam in the range from the wide-angle position to the telephoto position. Below the lower limit of Condition (9), the smallest high-order aberration is produced and in particular, correction for coma becomes difficult as the entire system. Beyond the upper limit, considerable high-order aberration is produced and the control of the position of the principal point in the second lens unit becomes difficult. When the lower limit of Condition (9) is set to −0.07 or the upper limit is set to 0.43, the balance between aberrations is more easily held, which is favorable.

In the zoom optical system of the present invention, it is desirable that the object-side surface of the first negative lens is configured as an aspherical surface satisfying the following condition:

$$0 < \Phi L2/\Phi H2 < 1.2 \tag{10}$$

where $\Phi L2$ is the amount of deviation, measured along the optical axis, from a reference spherical surface to the aspherical surface at a diameter −0.5 times the focal length at the wide-angle position and $\Phi H2$ is the amount of deviation, measured along the optical axis, from a reference spherical surface to the aspherical surface at a diameter 1.25 times the focal length at the wide-angle position. Here, the reference spherical surface refers to a spherical surface coming in contact with the vertex of the aspherical surface and having curvature at the vertex of the aspherical surface. In other words, the radius of the reference spherical surface is identical to the radius of curvature of the aspherical surface, measured along the optical axis.

By satisfying Condition (10), the performance of the off-axis light beam at the wide-angle position is not deteriorated, and even though the first lens unit is constructed with at most two lenses, it becomes easier to design a lens system whose total length is reduced. Below the lower limit of Condition (10), the position of the principal point is shifted to the image side, which is unfavorable. Beyond the upper limit, for example, the production of high-order aberration of the off-axis light beam at the wide-angle position becomes considerable, and as a result, it becomes difficult to keep favorable imaging performance.

Also, it is good practice to set the lower limit of Condition (10) to 0.03 or 0.05, or the upper limit to 1.0, 0.2, 0.12, or 0.1.

The imaging apparatus of the present invention comprises the zoom optical system of the present invention described above and an image sensor which converts an optical image into an electric signal, placed on the image side of the zoom optical system.

The zoom optical system of the present invention, in which image-side telecentricity is easily ensured, is preferred for a digital camera, a video camera, or an imaging module which uses an electronic image sensor in which the image quality is liable to be degraded at an angle of incidence on the imaging surface.

In accordance with the drawings and numerical data, the embodiments of the present invention will be described below.

First Embodiment

Figure 1B:
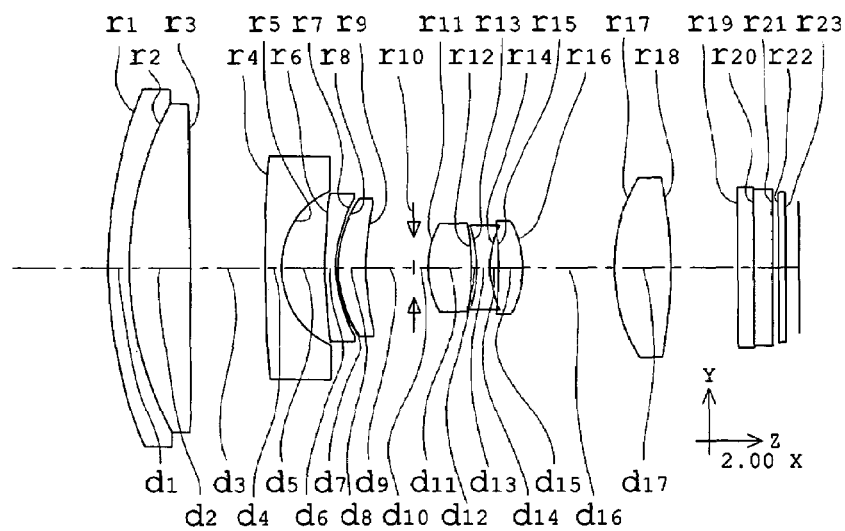
Figure 1C:
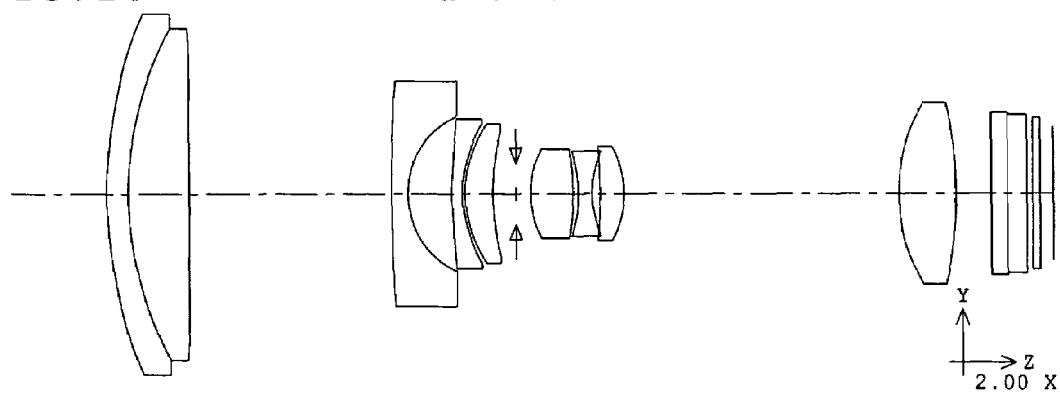
Figure 2A:
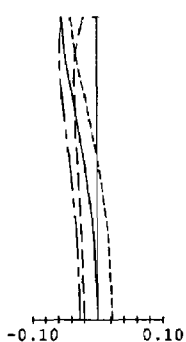
FIGS. 2A, 2B, 2C, and 2D are diagrams showing aberration characteristics at the wide-angle position in the first embodiment.
Figure 2B:
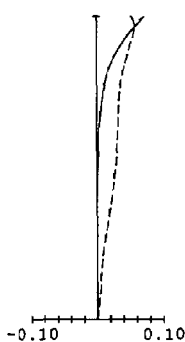
Figure 2C:
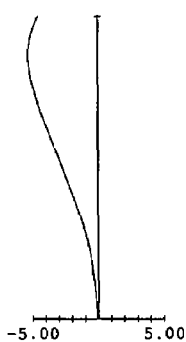
Figure 2D:
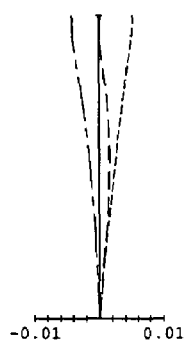
Figure 3A:
FIGS. 3A, 3B, 3C, and 3D are diagrams showing aberration characteristics at the middle position in the first embodiment.
Figure 3B:
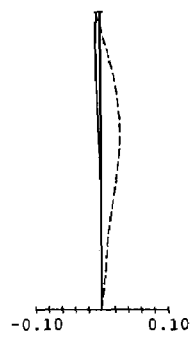
Figure 3C:
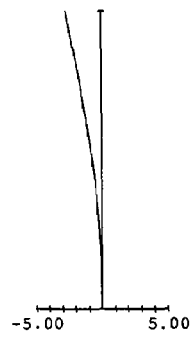
Figure 3D:
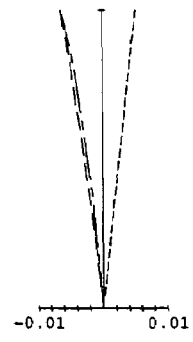
Figure 4A:
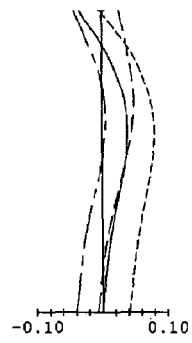
FIGS. 4A, 4B, 4C, and 4D are diagrams showing aberration characteristics at the telephoto position in the first embodiment.
Figure 4B:
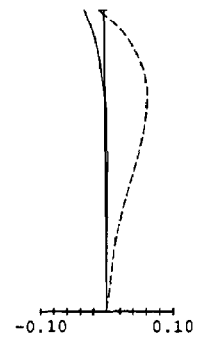
Figure 4C:
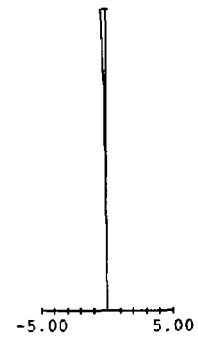
Figure 4D:
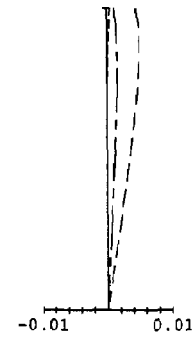

FIGS. 1A–1C show lens arrangements of the first embodiment of the zoom optical system according to the present invention. FIGS. 2A–2D, 3A–3D, and 4A–4D show aberration characteristics in the first embodiment.

A four-lens-unit zoom optical system of the first embodiment comprises, in order from the object side, a first lens unit G1 with positive refracting power, a second lens unit G2 with negative refracting power, an aperture stop S, a third lens unit G3 with positive refracting power, and a fourth lens unit G4 with positive refracting power. Reference symbol F denotes filters and I denotes the imaging surface of an electronic image sensor such as a CCD or the like.

The first lens unit G1 is constructed with a cemented lens of a first lens $L1_1$ with negative power and a second lens $L1_2$ with positive power, arranged in this order from the object side. The first lens $L1_1$ with negative power is configured as a meniscus lens with a convex surface facing the object side. The second lens $L1_2$ with positive power is a plano-convex lens with a convex surface facing the object side. The second lens unit G2 with negative refracting power includes, in order from the object side, a first lens $L2_1$ with negative power having an aspherical surface on the object side, a second lens $L2_2$ with negative power, and a third lens $L2_3$ with positive power. The first lens $L2_1$ with negative power is a meniscus lens with a convex surface facing the object side, the second lens $L2_2$ with negative power is also a meniscus lens with a convex surface facing the object side, and likewise the third lens $L2_3$ with positive power is a meniscus lens with a convex surface facing the object side. The third lens unit G3 with positive refracting power includes, in order from the object side, a first lens $L3_1$ with positive power, a second lens $L3_2$ with negative power, and a third lens $L3_3$ with positive power. The first lens $L3_1$ with positive power is a biconvex lens, the second lens $L3_2$ with negative power is a biconcave lens, and the third lens $L3_3$ with positive power is a biconvex lens whose both surfaces are aspherical. The fourth lens unit G4 with positive refracting power is constructed with a first biconvex lens $L4_1$.

The present invention adopts a zoom system that upon zooming from the wide-angle position to the telephoto position, the first, second, and third lens units G1, G2, and G3 are moved toward the object side so that the spacing between the first lens unit G1 and the second lens unit G2 is widened and the spacing between the second lens unit G2 and the third lens unit G3 is narrowed, and the fourth lens unit G4 is moved toward the image side. The stop S moves integrally with the third lens unit G3.

Each of the first lens unit G1 and the third lens unit G3 is moved in only one direction, the second lens unit G2 is moved along a locus that is convex toward the image side, and the fourth lens unit G4 is moved along a locus that is convex toward the object side.

Subsequently, lens data of optical members constituting the zoom optical system of the first embodiment are shown below. In the numerical data of the first embodiment, S denotes a lens face number, RDY denotes the radius of curvature of each lens surface, THI denotes the thickness of each lens or air spacing between lenses, Nd denotes the refractive index of each lens in the d line, Vd denotes the Abbe's number of each lens, f denotes a focal length, Fno denotes an F-number, and ω denotes a half angle of view. Also, when z is taken as the coordinate in the direction of the optical axis, y is taken as the coordinate normal to the optical axis, r represents the radius of curvature of each lens, K represents a conic coefficient, and $A_4$, $A_6$, $A_8$, and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4 y^4+A_6 y^6+A_8 y^8+A_{10} y^{10}$$

These symbols hold for the numerical data of the embodiments to be described later.

Numerical data 1
f: 6.16 mm~23.24 mm Fno: 2.8~4.8 2ω: 72.3°~21.9°
2ω: 43° at intermediate focal length

| S | RDY | THI | Nd | Vd |
|---|---|---|---|---|
| 1 | 35.33 | 1.50 | 1.84666 | 23.78 |
| 2 | 25.79 | 4.46 | 1.69350 | 53.21 |
| 3 | INF | D1 | | |
| 4 | 285.07 | 1.20 | 1.77250 | 49.60 |
|   | (aspherical surface) | | | |
| 5 | 6.33 | 3.41 | | |
| 6 | 35.06 | 0.80 | 1.57135 | 52.95 |
| 7 | 9.24 | 0.14 | | |
| 8 | 8.12 | 2.27 | 1.84666 | 23.78 |
| 9 | 17.43 | D2 | | |
| 10 | INF (stop) | 1.00 | | |
| 11 | 7.41 | 3.12 | 1.88300 | 40.76 |
| 12 | −24.13 | 0.37 | | |
| 13 | −11.37 | 1.00 | 1.80518 | 25.42 |
| 14 | 7.46 | 0.58 | | |
| 15 | 1039.49 | 1.81 | 1.69350 | 53.21 |
|   | (aspherical surface) | | | |
| 16 | −8.90 | D3 | | |
|   | (aspherical surface) | | | |
| 17 | 13.33 | 4.32 | 1.48749 | 70.23 |
| 18 | −34.06 | D4 | | |
| 19 | INF | 1.20 | 1.51633 | 64.14 |
| 20 | INF | 1.56 | 1.54771 | 62.84 |
| 21 | INF | 0.60 | | |
| 22 | INF | 0.50 | 1.51633 | 64.14 |
| 23 | INF | 1.0 | | |
| 24 | INF | | | |
|   | (imaging surface) | | | |

Aspherical coefficients

Fourth surface $K = -150.2774$
$A_4 = 8.1548 \times 10^{-5}$  $A_6 = -3.1435 \times 10^{-7}$  $A_8 = 2.1764 \times 10^{-10}$ Fifteenth surface $K = 0.$
$A_4 = -7.0627 \times 10^{-4}$  $A_6 = -3.1089 \times 10^{-5}$  $A_8 = 1.7763 \times 10^{-6}$ -continued Aspherical coefficients Sixteenth surface K = 0.0839
$A_4 = -3.1546 \times 10^{-4}$  $A_6 = -3.1004 \times 10^{-5}$  $A_8 = 1.1579 \times 10^{-6}$ Zoom data

|  | Wide-angle position | Middle position | Telephoto position |
|---|---|---|---|
| Focal length | 6.16 | 11.33 | 23.24 |
| Fno | 2.82 | 3.39 | 4.80 |
| D1 | 1.20 | 5.57 | 15.12 |
| D2 | 11.39 | 3.59 | 1.50 |
| D3 | 2.54 | 6.98 | 21.05 |
| D4 | 3.63 | 5.37 | 2.87 |

Second Embodiment

Figure 5A:
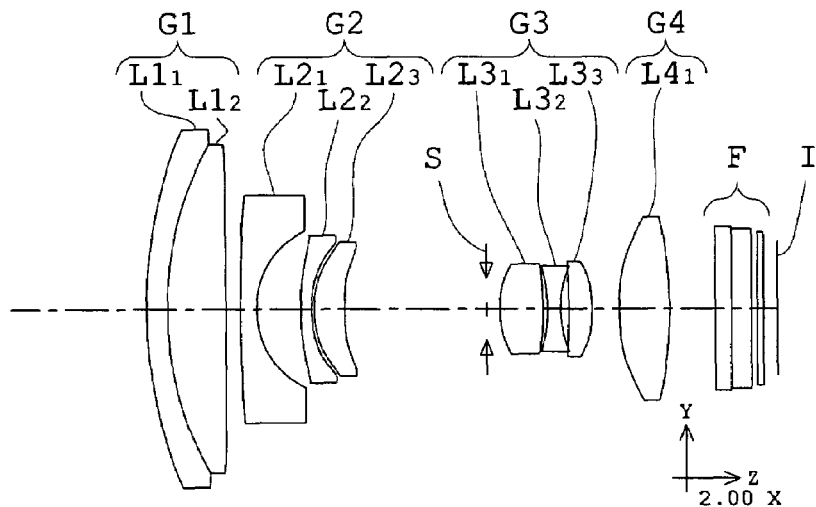
FIGS. 5A, 5B, and 5C are sectional views showing lens arrangements, developed along the optical axis, at wide-angle, middle, and telephoto positions, respectively, of a second embodiment of the zoom optical system according to the present invention.
Figure 5B:
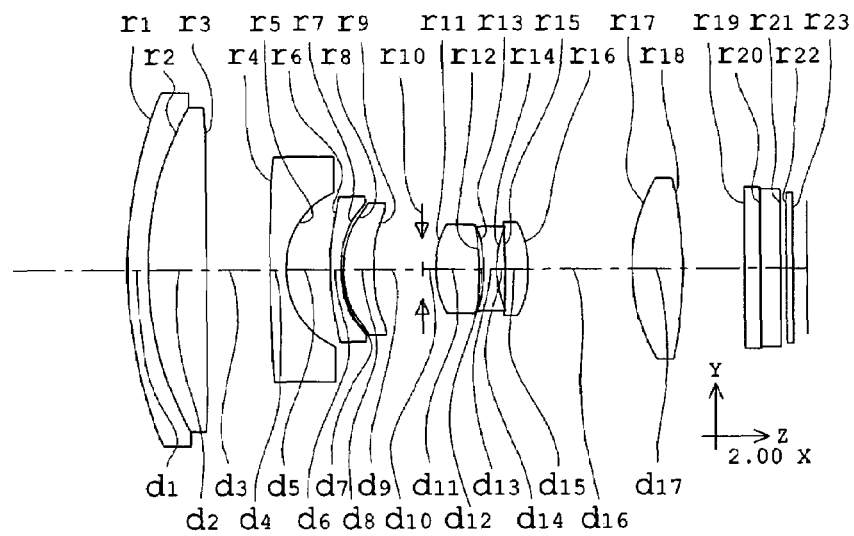
Figure 5C:
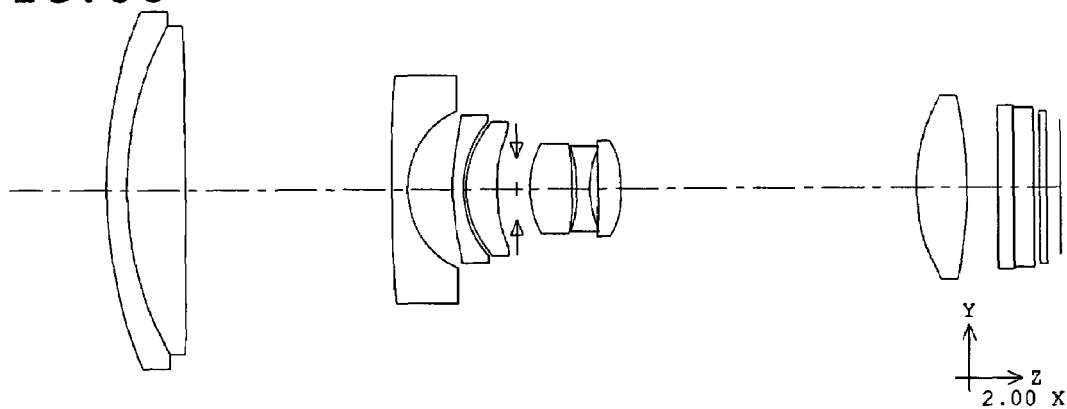
Figure 6A:
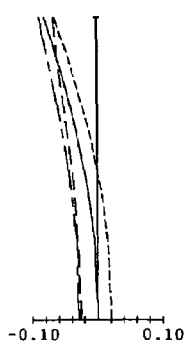
FIGS. 6A, 6B, 6C, and 6D are diagrams showing aberration characteristics at the wide-angle position in the second embodiment.
Figure 6B:
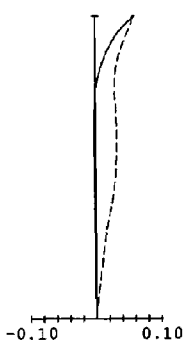
Figure 6C:
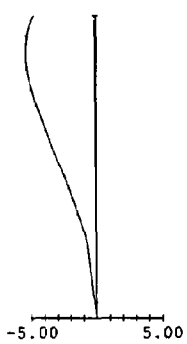
Figure 6D:
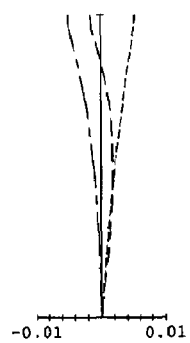
Figure 7A:
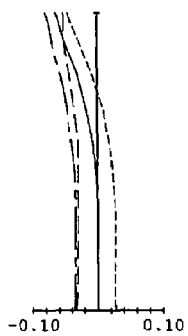
FIGS. 7A, 7B, 7C, and 7D are diagrams showing aberration characteristics at the middle position in the second embodiment.
Figure 7B:
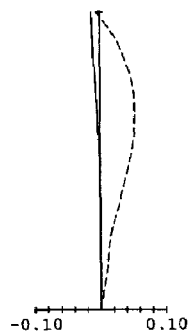
Figure 7C:
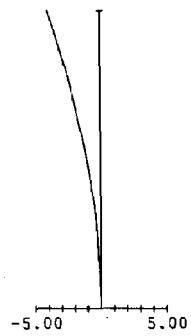
Figure 7D:
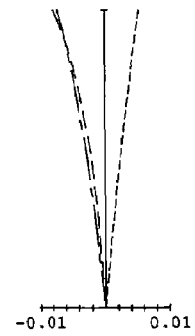
Figure 8A:
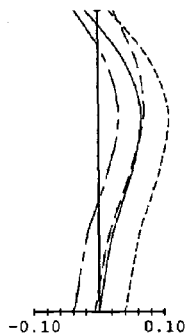
FIGS. 8A, 8B, 8C, and 8D are diagrams showing aberration characteristics at the telephoto position in the second embodiment.
Figure 8B:
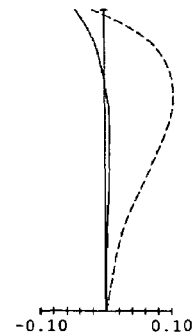
Figure 8C:
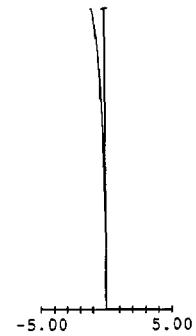
Figure 8D:
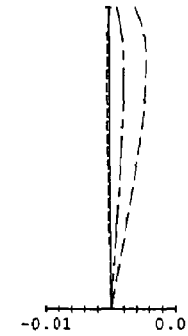

FIGS. 5A–5C show lens arrangements of the second embodiment of the zoom optical system according to the present invention. FIGS. 6A–6D, 7A–7D, and 8A–8D show aberration characteristics in the second embodiment.

A four-lens-unit zoom optical system of the second embodiment comprises, in order from the object side, the first lens unit G1 with positive refracting power, the second lens unit G2 with negative refracting power, the aperture stop S, the third lens unit G3 with positive refracting power, and the fourth lens unit G4 with positive refracting power. Again, reference symbol F denotes filters and I denotes the imaging surface of an electronic image sensor such as a CCD or the like.

The first lens unit G1 is constructed with a cemented lens of a first lens $L1_1$ with negative power and a second lens $L1_2$ with positive power, arranged in this order from the object side. The first lens $L1_1$ with negative power is configured as a meniscus lens with a convex surface facing the object side. The second lens $L1_2$ with positive power is a biconvex lens. The second lens unit G2 with negative refracting power includes, in order from the object side, the first lens $L2_1$ with negative power having an aspherical surface on the object side, the second lens $L2_2$ with negative power, and the third lens $L2_3$ with positive power. The first lens $L2_1$ with negative power is a meniscus lens with a convex surface facing the object side, the second lens $L2_2$ with negative power is also a meniscus lens with a convex surface facing the object side, and likewise the third lens $L2_3$ with positive power is a meniscus lens with a convex surface facing the object side. The third lens unit G3 with positive refracting power includes, in order from the object side, the first lens $L3_1$ with positive power, the second lens $L3_2$ with negative power, and the third lens $L3_3$ with positive power. The first lens $L3_1$ with positive power is a biconvex lens, the second lens $L3_2$ with negative power is a biconcave lens, and the third lens $L3_3$ with positive power is a biconvex lens whose both surfaces are aspherical. The fourth lens unit G4 with positive refracting power is constructed with the first biconvex lens $L4_1$.

The present invention adopts a zoom system that upon zooming from the wide-angle position to the telephoto position, the first, second, and third lens units G1, G2, and G3 are moved toward the object side so that the spacing between the first lens unit G1 and the second lens unit G2 is widened and the spacing between the second lens unit G2 and the third lens unit G3 is narrowed, and the fourth lens unit G4 is moved toward the image side. The stop S moves integrally with the third lens unit G3.

Each of the first lens unit G1 and the third lens unit G3 is moved in only one direction, the second lens unit G2 is moved along a locus that is convex toward the image side, and the fourth lens unit G4 is moved along a locus that is convex toward the object side.

Subsequently, lens data of optical members constituting the zoom optical system of the second embodiment are shown below.

Numerical data 2
f: 6.1 mm~23.18 mm Fno: 2.8~4.7 2ω: 72.9°~22°
2ω: 46° at intermediate focal length

| S | RDY | THI | Nd | Vd |
|---|---|---|---|---|
| 1 | 35.70 | 1.50 | 1.84666 | 23.78 |
| 2 | 25.49 | 4.39 | 1.69350 | 53.21 |
| 3 | −5428.70 | D1 | | |
| 4 | 434.51 (aspherical surface) | 1.20 | 1.77250 | 49.60 |
| 5 | 6.57 | 3.44 | | |
| 6 | 20.13 | 0.80 | 1.57135 | 52.95 |
| 7 | 7.67 | 0.25 | | |
| 8 | 7.38 | 2.28 | 1.84666 | 23.78 |
| 9 | 13.70 | D2 | | |
| 10 | INF (stop) | 1.00 | | |
| 11 | 7.33 | 3.13 | 1.88300 | 40.76 |
| 12 | −23.95 | 0.37 | | |
| 13 | −11.17 | 1.00 | 1.80518 | 25.42 |
| 14 | 7.46 | 0.61 | | |
| 15 | −1393.82 (aspherical surface) | 1.80 | 1.69350 | 53.21 |
| 16 | −8.72 (aspherical surface) | D3 | | |
| 17 | 12.60 | 4.23 | 1.49700 | 81.54 |
| 18 | −29.76 | D4 | | |
| 19 | INF | 1.20 | 1.51633 | 64.14 |
| 20 | INF | 1.56 | 1.54771 | 62.84 |
| 21 | INF | 0.60 | | |
| 22 | INF | 0.50 | 1.51633 | 64.14 |
| 23 | INF | 1.00 | | |
| 24 | INF (imaging surface) | | | |

Aspherical coefficients

Fourth surface

K = 72.2943
$A_4 = 8.1508 \times 10^{-5}$  $A_6 = -3.2708 \times 10^{-7}$  $A_8 = 1.2960 \times 10^{-10}$ Fifteenth surface K = 0
$A_4 = -6.9427 \times 10^{-4}$  $A_6 = -2.6382 \times 10^{-5}$  $A_8 = 1.7426 \times 10^{-6}$ Sixteenth surface K = −0.0170
$A_4 = -2.9664 \times 10^{-4}$  $A_6 = -2.9948 \times 10^{-5}$  $A_8 = 1.2670 \times 10^{-6}$ Zoom data

|  | Wide-angle position | Middle position | Telephoto position |
|---|---|---|---|
| Focal length | 6.10 | 10.57 | 23.18 |
| Fno | 2.84 | 3.41 | 4.79 |

-continued

Zoom data

|    | Wide-angle position | Middle position | Telephoto position |
|----|---------------------|-----------------|--------------------|
| D1 | 1.20                | 4.68            | 15.16              |
| D2 | 10.17               | 3.74            | 1.50               |
| D3 | 1.88                | 7.43            | 22.02              |
| D4 | 3.63                | 4.57            | 2.06               |

Third Embodiment

Figure 9A:
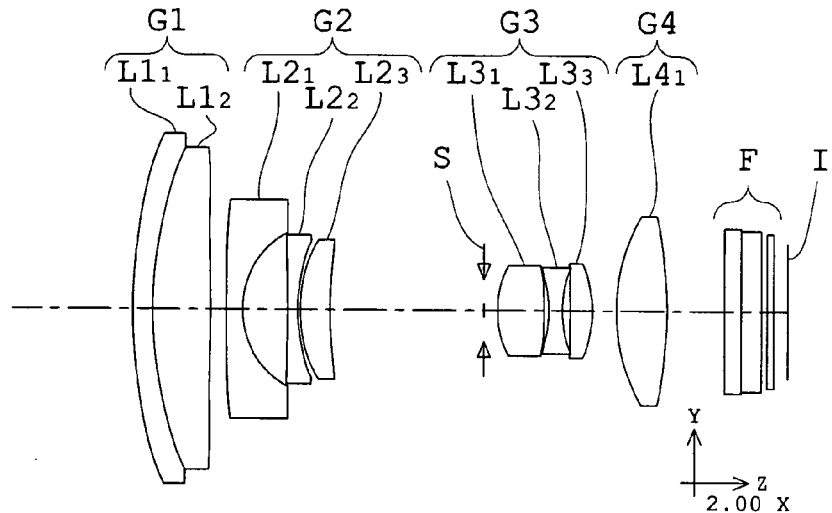
FIGS. 9A, 9B, and 9C are sectional views showing lens arrangements, developed along the optical axis, at wide-angle, middle, and telephoto positions, respectively, of a third embodiment of the zoom optical system according to the present invention.
Figure 9B:
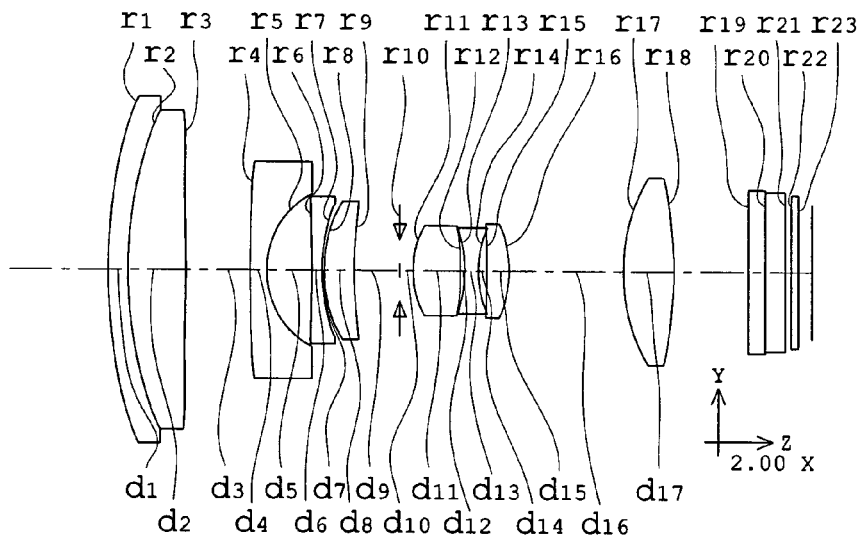
Figure 9C:
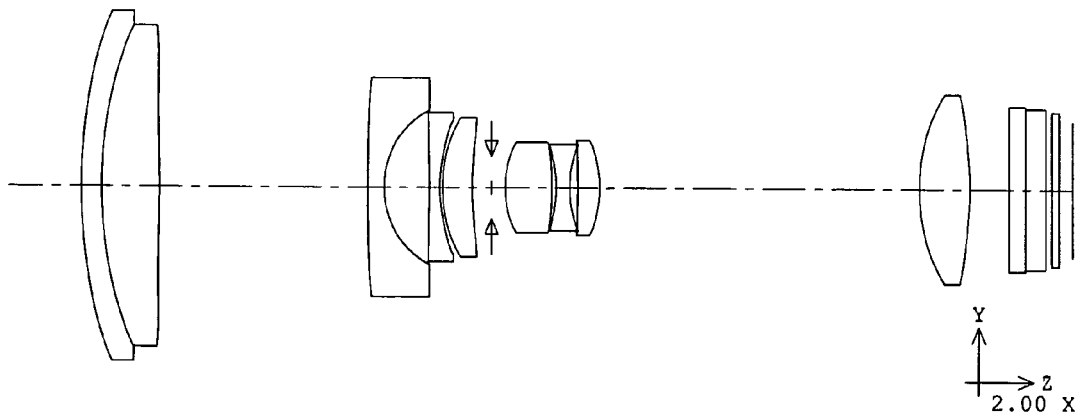
Figure 10A:
FIGS. 10A, 10B, 10C, and 10D are diagrams showing aberration characteristics at the wide-angle position in the third embodiment.
Figure 10B:
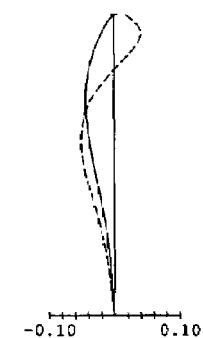
Figure 10C:
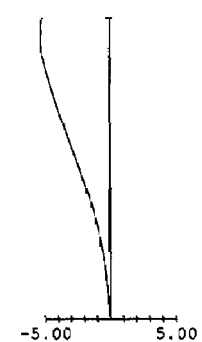
Figure 10D:
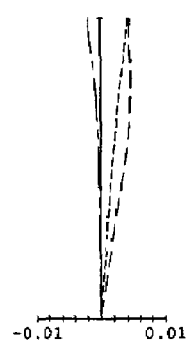
Figure 11A:
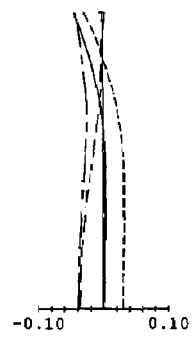
FIGS. 11A, 11B, 11C, and 11D are diagrams showing aberration characteristics at the middle position in the third embodiment.
Figure 11B:
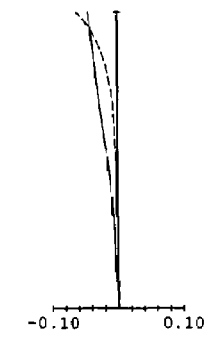
Figure 11C:
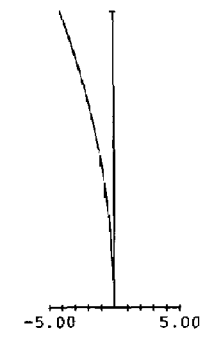
Figure 11D:
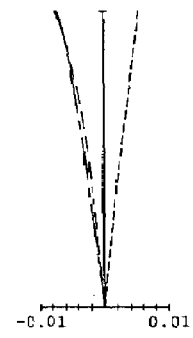
Figure 12A:
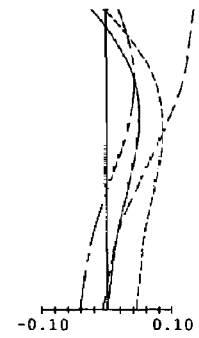
FIGS. 12A, 12B, 12C, and 12D are diagrams showing aberration characteristics at the telephoto position in the third embodiment.
Figure 12B:
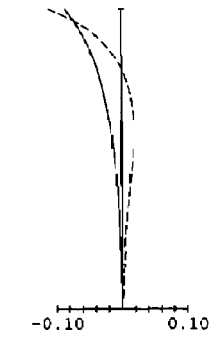
Figure 12C:
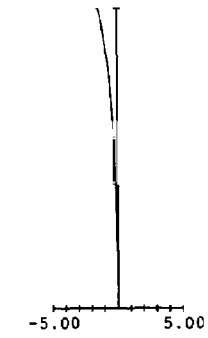
Figure 12D:
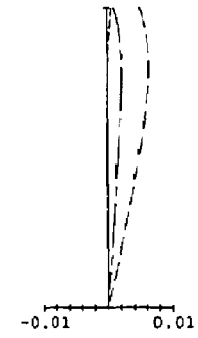

FIGS. 9A–9C show lens arrangements of the third embodiment of the zoom optical system according to the present invention. FIGS. 10A–10D, 11A–11D, and 12A–12D show aberration characteristics in the third embodiment.

A four-lens-unit zoom optical system of the third embodiment comprises, in order from the object side, the first lens unit G1 with positive refracting power, the second lens unit G2 with negative refracting power, the aperture stop S, the third lens unit G3 with positive refracting power, and the fourth lens unit G4 with positive refracting power. Again, reference symbol F denotes filters and I denotes the imaging surface of an electronic image sensor such as a CCD or the like.

The first lens unit G1 is constructed with a cemented lens of a first lens $L1_1$ with negative power and a second lens $L1_2$ with positive power, arranged in this order from the object side. The first lens $L1_1$ with negative power is configured as a meniscus lens with a convex surface facing the object side. The second lens $L1_2$ with positive power is a meniscus lens with a convex surface facing the object side. The second lens unit G2 with negative refracting power includes, in order from the object side, the first lens $L2_1$ with negative power having an aspherical surface on the object side, the second lens $L2_2$ with negative power, and the third lens $L2_3$ with positive power. The first lens $L2_1$ with negative power is a meniscus lens with a convex surface facing the object side, the second lens $L2_2$ with negative power is a biconcave lens, and the third lens $L2_3$ with positive power is a meniscus lens with a convex surface facing the object side. The third lens unit G3 with positive refracting power includes, in order from the object side, the first lens $L3_1$ with positive power, the second lens $L3_2$ with negative power, and the third lens $L3_3$ with positive power. The first lens $L3_1$ with positive power is a biconvex lens whose object-side surface is aspherical, the second lens $L3_2$ with negative power is a biconcave lens, and the third lens $L3_3$ with positive power is a biconvex lens whose object-side surface is aspherical. The fourth lens unit G4 with positive refracting power is constructed with the first biconvex lens $L4_1$.

The present invention adopts a zoom system that upon zooming from the wide-angle position to the telephoto position, the first, second, and third lens units G1, G2, and G3 are moved toward the object side so that the spacing between the first lens unit G1 and the second lens unit G2 is widened and the spacing between the second lens unit G2 and the third lens unit G3 is narrowed, and the fourth lens unit G4 is moved toward the image side. The stop S moves integrally with the third lens unit G3.

Each of the first lens unit G1 and the third lens unit G3 is moved in only one direction, the second lens unit G2 is moved along a locus that is convex toward the image side, and the fourth lens unit G4 is moved along a locus that is convex toward the object side.

Subsequently, lens data of optical members constituting the zoom optical system of the third embodiment are shown below.

Numerical data 3
f: 6.1 mm~23.03 mm Fno: 2.8~4.8 2ω: 72.9°~22.1°
2ω: 44° at intermediate focal length

| S  | RDY                 | THI    | Nd      | Vd    |
|----|---------------------|--------|---------|-------|
| 1  | 34.86               | 1.50   | 1.84666 | 23.78 |
| 2  | 27.98               | 4.34   | 1.64000 | 60.08 |
| 3  | 1495.15             | D1     |         |       |
| 4  | 262.49              | 1.2000 | 1.77250 | 49.60 |
|    | (aspherical surface)|        |         |       |
| 5  | 6.44                | 3.41   |         |       |
| 6  | −271.07             | 0.80   | 1.57135 | 52.95 |
| 7  | 13.30               | 0.13   |         |       |
| 8  | 9.95                | 2.24   | 1.84666 | 23.78 |
| 9  | 29.30               | D2     |         |       |
| 10 | INF (stop)          | 1.00   |         |       |
| 11 | 7.53                | 3.48   | 1.88300 | 40.76 |
|    | (aspherical surface)|        |         |       |
| 12 | −23.66              | 0.34   |         |       |
| 13 | −11.51              | 1.00   | 1.80518 | 25.42 |
| 14 | 7.47                | 0.62   |         |       |
| 15 | 7308.16             | 1.75   | 1.69350 | 53.21 |
|    | (aspherical surface)|        |         |       |
| 16 | −9.19               | D3     |         |       |
| 17 | 13.36               | 3.92   | 1.49700 | 81.54 |
| 18 | −29.93              | D4     |         |       |
| 19 | INF                 | 1.2000 | 1.51633 | 64.14 |
| 20 | INF                 | 1.5600 | 1.54771 | 62.84 |
| 21 | INF                 | 0.6000 |         |       |
| 22 | INF                 | 0.5000 | 1.51633 | 64.14 |
| 23 | INF                 | 1.00   |         |       |
| 24 | INF                 |        |         |       |
|    | (imaging surface)   |        |         |       |

Aspherical coefficients

Fourth surface

K = 89.9689
$A_4 = 1.0459 \times 10^{-4}$   $A_6 = -9.0072 \times 10^{-7}$   $A_8 = 4.4969 \times 10^{-9}$ Eleventh surface K = −0.1184
$A_4 = 9.5266 \times 10^{-5}$   $A_6 = 4.8630 \times 10^{-6}$ Fifteenth surface K = −4.602 × 10⁵
$A_4 = 2.0885 \times 10^{-7}$   $A_6 = -3.1959 \times 10^{-6}$   $A_8 = -9.3537 \times 10^{-8}$

Zoom data

|              | Wide-angle position | Middle position | Telephoto position |
|--------------|---------------------|-----------------|--------------------|
| Focal length | 6.10                | 11.12           | 23.03              |
| Fno          | 2.84                | 3.41            | 4.79               |
| D1           | 1.20                | 4.68            | 15.18              |
| D2           | 10.98               | 3.40            | 1.50               |
| D3           | 1.82                | 8.33            | 23.41              |
| D4           | 4.08                | 5.31            | 2.57               |

Fourth Embodiment

Figure 13A:
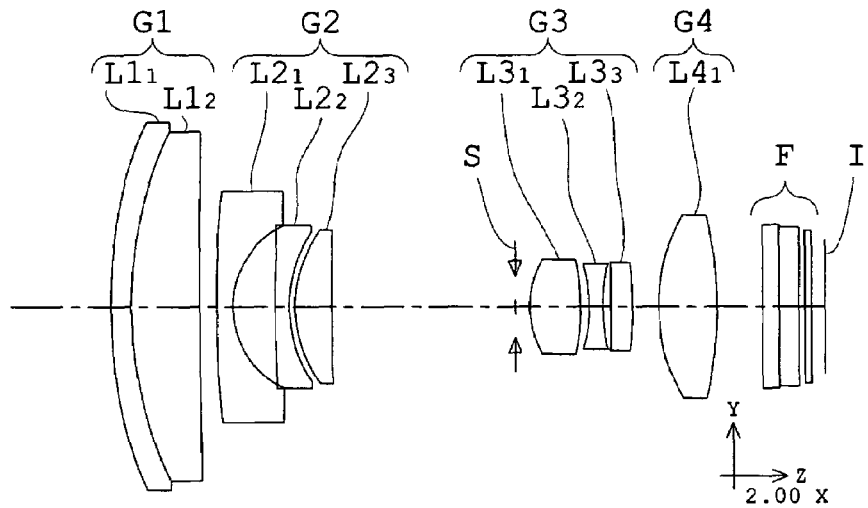
FIGS. 13A, 13B, and 13C are sectional views showing lens arrangements, developed along the optical axis, at wide-angle, middle, and telephoto positions, respectively, of a fourth embodiment of the zoom optical system according to the present invention.
Figure 13B:
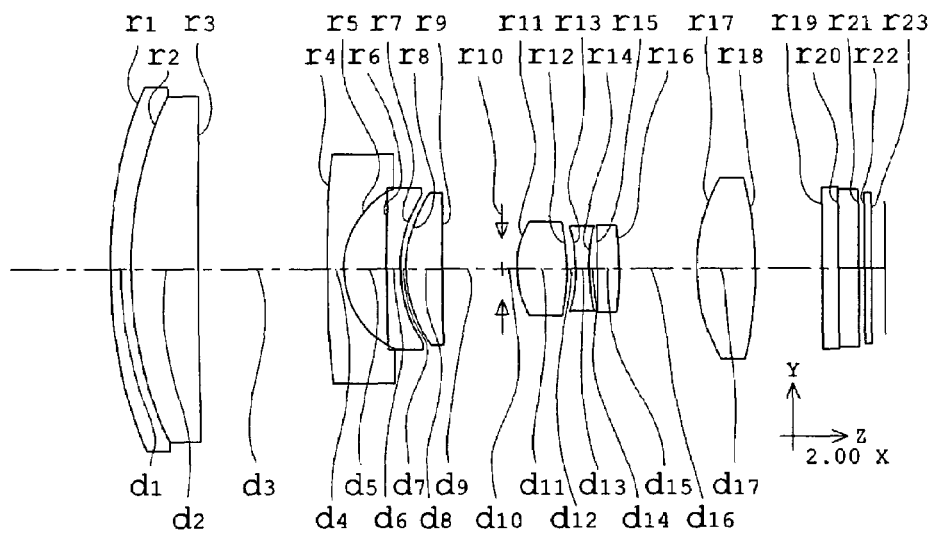
Figure 13C:
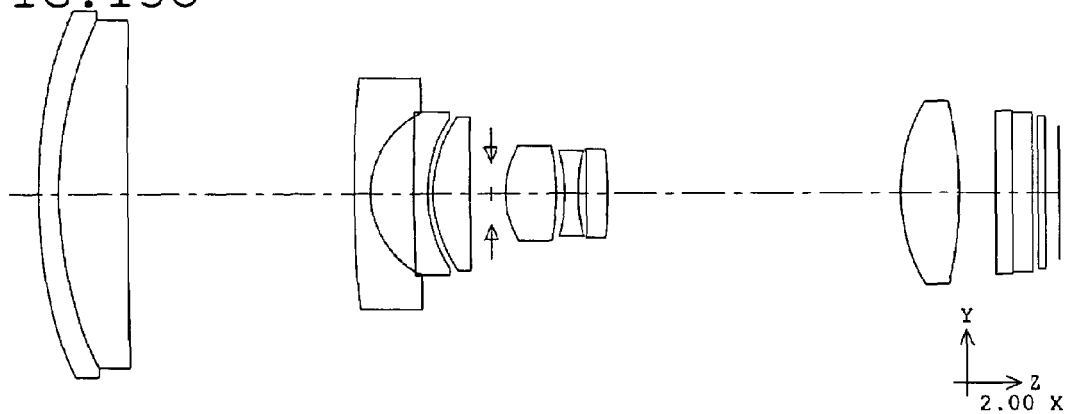
Figure 14A:
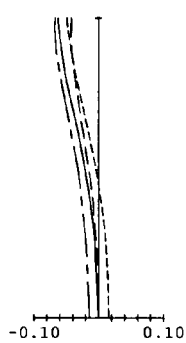
FIGS. 14A, 14B, 14C, and 14D are diagrams showing aberration characteristics at the wide-angle position in the fourth embodiment.
Figure 14B:
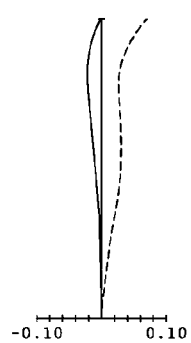
Figure 14C:
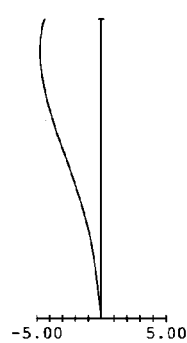
Figure 14D:
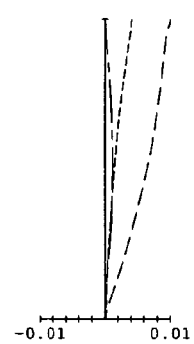
Figure 15A:
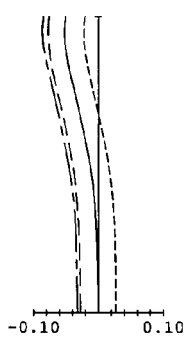
FIGS. 15A, 15B, 15C, and 15D are diagrams showing aberration characteristics at the middle position in the fourth embodiment.
Figure 15B:
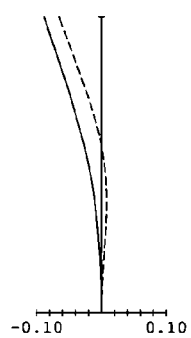
Figure 15C:
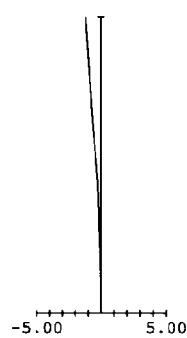
Figure 15D:
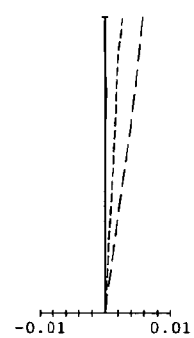
Figure 16A:
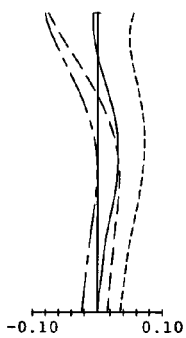
FIGS. 16A, 16B, 16C, and 16D are diagrams showing aberration characteristics at the telephoto position in the fourth embodiment.
Figure 16B:
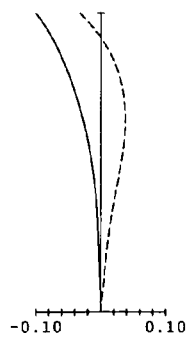
Figure 16C:
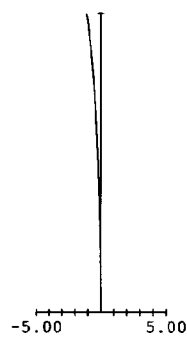
Figure 16D:
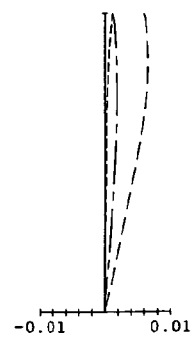

FIGS. 13A–13C show lens arrangements of the fourth embodiment of the zoom optical system according to the present invention. FIGS. 14A–14D, 15A–15D, and 16A–16D show aberration characteristics in the fourth embodiment.

A four-lens-unit zoom optical system of the fourth embodiment comprises, in order from the object side, the first lens unit G1 with positive refracting power, the second lens unit G2 with negative refracting power, the aperture stop S, the third lens unit G3 with positive refracting power, and the fourth lens unit G4 with positive refracting power.

Again, reference symbol F denotes filters and I denotes the imaging surface of an electronic image sensor such as a CCD or the like.

The first lens unit G1 is constructed with a cemented lens of a first lens $L1_1$ with negative power and a second lens $L1_2$ with positive power, arranged in this order from the object side. The first lens $L1_1$ with negative power is configured as a meniscus lens with a convex surface facing the object side. The second lens $L1_2$ with positive power is a meniscus lens with a convex surface facing the object side. The second lens unit G2 with negative refracting power includes, in order from the object side, the first lens $L2_1$ with negative power having an aspherical surface on the object side, the second lens $L2_2$ with negative power, and the third lens $L2_3$ with positive power. The first lens $L2_1$ with negative power is a meniscus lens with a convex surface facing the object side, the second lens $L2_2$ with negative power is also a meniscus lens with a convex surface facing the object side, and likewise the third lens $L2_3$ with positive power is a meniscus lens with a convex surface facing the object side. The third lens unit G3 with positive refracting power includes, in order from the object side, the first lens $L3_1$ with positive power, the second lens $L3_2$ with negative power, and the third lens $L3_3$ with positive power. The first lens $L3_1$ with positive power is a biconvex lens, the second lens $L3_2$ with negative power is a biconcave lens, and the third lens $L3_3$ with positive power is a biconvex lens whose both surfaces are aspherical. The fourth lens unit G4 with positive refracting power is constructed with the first biconvex lens $L4_1$.

The present invention adopts a zoom system that upon zooming from the wide-angle position to the telephoto position, the first, second, and third lens units G1, G2, and G3 are moved toward the object side so that the spacing between the first lens unit G1 and the second lens unit G2 is widened and the spacing between the second lens unit G2 and the third lens unit G3 is narrowed, and the fourth lens unit G4 is moved toward the image side. The stop S moves integrally with the third lens unit G3.

Each of the first lens unit G1 and the third lens unit G3 is moved in only one direction, the second lens unit G2 is moved along a locus that is convex toward the image side, and the fourth lens unit G4 is moved along a locus that is convex toward the object side.

Subsequently, lens data of optical members constituting the zoom optical system of the fourth embodiment are shown below.

Numerical data 4
f: 6.00 mm~23.18 mm Fno: 2.8~4.8 2ω: 73.7°~22.0°
2ω: 43° at intermediate focal length

| S | RDY | THI | Nd | Vd |
|---|---|---|---|---|
| 1 | 34.76 | 1.50 | 1.84666 | 23.78 |
| 2 | 29.82 | 4.99 | 1.58313 | 59.38 |
| 3 | 372.16 | D1 | | |
| 4 | 435.64 (aspherical surface) | 1.20 | 1.80610 | 40.92 |
| 5 | 6.85 | 3.11 | | |
| 6 | 98.90 | 1.10 | 1.74100 | 52.64 |
| 7 | 10.14 | 0.40 | | |
| 8 | 9.72 | 2.73 | 1.80518 | 25.42 |
| 9 | 165.87 | D2 | | |
| 10 | INF (stop) | 1.00 | | |
| 11 | 7.22 | 3.70 | 1.77250 | 49.60 |
| 12 | −23.01 | 0.65 | | |
| 13 | −12.89 | 1.02 | 1.84666 | 23.78 |
| 14 | 12.44 | 0.59 | | |
| 15 | 828.06 (aspherical surface) | 1.74 | 1.78800 | 47.37 |
| 16 | −18.69 (aspherical surface) | D3 | | |
| 17 | 13.97 | 4.26 | 1.51633 | 64.14 |
| 18 | −35.32 | D4 | | |
| 19 | INF | 1.20 | 1.51633 | 64.14 |
| 20 | INF | 1.56 | 1.54771 | 62.84 |
| 21 | INF | 0.60 | | |
| 22 | INF | 0.50 | 1.51633 | 64.14 |
| 23 | INF | 1.00 | | |
| 24 | INF (imaging surface) | | | |

Aspherical coefficients

Fourth surface $K = -355.2153$
$A_4 = 1.0300 \times 10^{-4}$  $A_6 = -4.6263 \times 10^{-7}$  $A_8 = 1.1657 \times 10^{-9}$ Fifteenth surface $K = 2.090 \times 10^4$
$A_4 = -2.0237 \times 10^{-4}$  $A_6 = 1.3359 \times 10^{-6}$  $A_8 = 1.9654 \times 10^{-6}$ Sixteenth surface $K = 0.5117$
$A_4 = 4.3126 \times 10^{-4}$  $A_6 = 2.4350 \times 10^{-6}$  $A_8 = 3.0521 \times 10^{-6}$ Zoom data

| | Wide-angle position | Middle position | Telephoto position |
|---|---|---|---|
| Focal length | 6.00 | 11.56 | 23.18 |
| Fno | 2.85 | 3.30 | 4.81 |
| D1 | 1.30 | 9.73 | 17.04 |
| D2 | 13.73 | 4.50 | 150 |
| D3 | 1.86 | 5.75 | 21.84 |
| D4 | 3.39 | 4.98 | 2.69 |

Subsequently, values of the conditions in the embodiments are listed in a table shown below.

| | Ex. 1 | Ex. 2 | Ex. 3 | Ex. 4 |
|---|---|---|---|---|
| Conditions | | | | |
| (1) | −0.26978 | −0.47013 | 0.036518 | −0.10915 |
| (2) | 0.074803 | 0.0625 | 0.076923 | 0.056511 |
| (3) | 0.655262 | 0.868706 | 0.7383 | 0.585551 |

-continued

|  | Ex. 1 | Ex. 2 | Ex. 3 | Ex. 4 |
|---|---|---|---|---|
| (6) | 3.52986 | 3.905616 | 4.030757 | 3.798022 |
| (7) | 2.468181 | 2.454884 | 2.404293 | 2.621601 |
| (8) | 1.051656 | 1.047053 | 1.034395 | 1.034633 |
| (9) | 0.26341 | 0.38124 | −0.04905 | 0.102542 |
| (10) | 0.083333 | 0.072874 | 0.085809 | 0.066421 |
| ST/(Tt − Tw) | 0.876 | 0.854 | 0.853 | 0.795 |
| (Tt − Tw)/Tw | 0.438 | 0.499 | 0.504 | 0.429 |
| Parameters | | | | |
| Tw | 49.634 | 47.706 | 48.687 | 53.127 |
| Tt | 71.362 | 71.519 | 73.241 | 75.919 |
| fw | 6.156 | 6.097 | 6.092 | 6.001 |
| ft | 23.245 | 23.175 | 23.034 | 23.178 |
| en30 | 15.19301 | 14.96763 | 14.64577 | 15.73286 |
| en35 | 15.97783 | 15.67191 | 15.14952 | 16.27773 |
| ΦL1 | 0.019 | 0.014 | 0.024 | 0.023 |
| ΦH1 | 0.254 | 0.224 | 0.312 | 0.407 |
| ΦL2 | 0.024 | 0.018 | 0.026 | 0.018 |
| ΦH2 | 0.288 | 0.247 | 0.303 | 0.271 |
| f2 | −9.460 | −9.462 | −9.899 | −10.795 |
| R23 | 35.0647 | 20.1267 | −271.067 | 98.9007 |
| R24 | 9.2364 | 7.6731 | 13.297 | 10.1415 |
| Focal length used as the proximity of intermediate focal length state | 11.33 | 10.57 | 11.12 | 11.56 |
| ST | 19.041 | 20.326 | 20.948 | 18.122 |
| Δ13 | 4.0335 | 5.29657 | 4.49736 | 3.51403 |

Figure 17A:
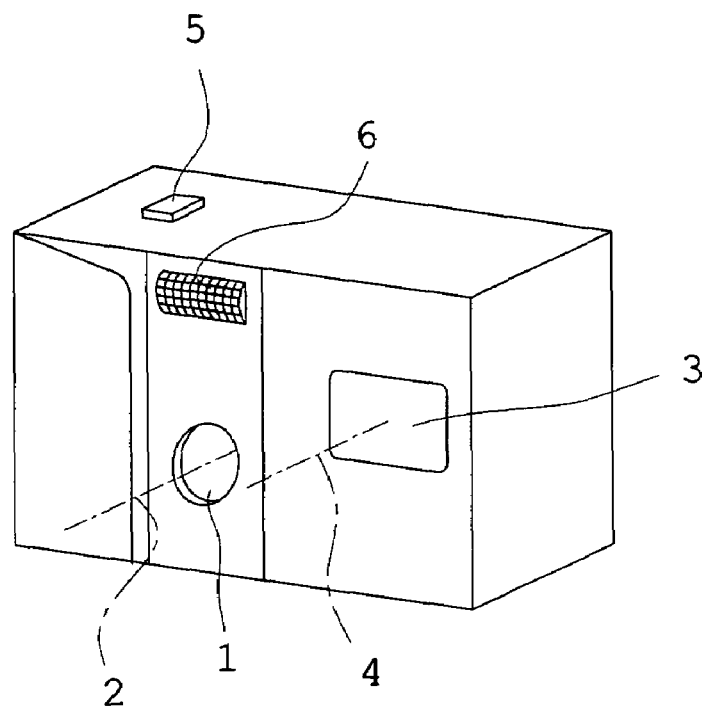
FIGS. 17A and 17B are front and rear perspective views, respectively, showing the appearance of a digital camera whose imaging optical system includes the zoom optical system of the present invention.
Figure 17B:
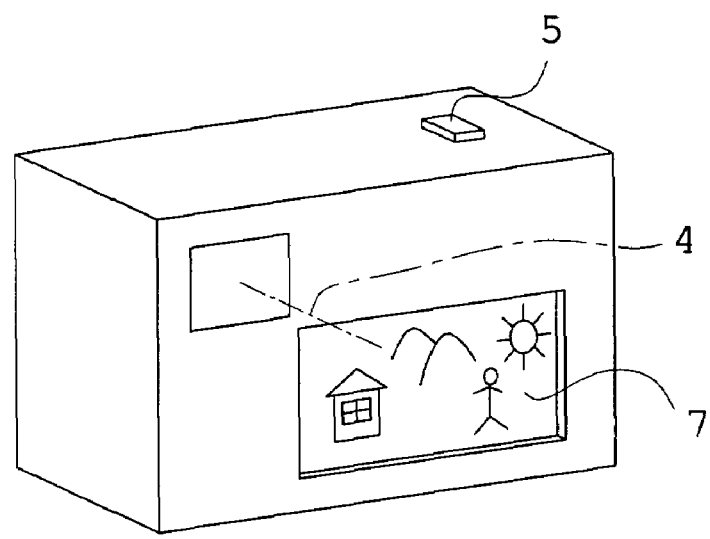

FIGS. 17A and 17B show the appearance of a digital camera whose imaging optical system includes the zoom optical system of the present invention. In these figures, reference numeral 1 denotes a photographing optical system having a photographing optical path 2, 3 denotes a finder optical system having a finder optical path 4, 5 denotes a shutter button, 6 denotes a flash lamp, and 7 denotes a liquid crystal display monitor. The digital camera is such that when the shutter button placed on the upper portion of the camera is pushed, photographing is performed through the photographing optical system 1 in association with the operation of the shutter button.

The zoom optical system of the present invention, in which image-side telecentricity is easily ensured, is preferred for a digital camera, a video camera, or an imaging module which uses an electronic image sensor in which the image quality is liable to be degraded at an angle of incidence on the imaging surface.

According to the present invention, the zoom lens which has a wide angle of view at the wide-angle position and is advantageous for the high variable magnification ratio can be provided. In particular, the zoom lens which is small in size and good in performance, accommodating an angle of view of 70° or more and a zoom magnification of 3.5 or more at the wide-angle position, can be provided.

What is claimed is:

1. A zoom optical system comprising, in order from an object side:
   a first lens unit with positive refracting power;
   a second lens unit with negative refracting power;
   a third lens unit with positive refracting power; and
   a fourth lens unit with positive refracting power,
   an aperture stop being interposed between the second lens unit and the fourth lens unit,
   at least, the first lens unit, the second lens unit, and the third lens unit being moved upon zooming so that spacings between individual lens units are varied,
   the first lens unit being composed of at most two lens elements,
   the second lens unit including, in order from the object side:
   a first negative lens in which an image-side surface is greater in curvature than an object-side surface;
   an air spacing;
   a second negative lens in which an image-side surface is greater in curvature than an object-side surface;
   an air spacing; and
   a positive lens in which an object-side surface is greater in curvature than an image-side surface,
   the second negative lens satisfying the following condition:

$$-0.7 < f2/R23 < 0.05$$

where R23 is a radius of curvature of the object-side surface of the second negative lens and f2 is a focal length of the second lens unit,
   wherein the first lens unit is always moved toward the object side upon zooming from a wide-angle position to a telephoto position.

2. A zoom optical system according to claim 1, wherein the third lens unit is composed of a positive lens, an air spacing, a negative lens, an air spacing, and a positive lens.

3. A zoom optical system according to claim 2, wherein the third lens unit consists of three single lenses.

4. A zoom optical system according to claim 2, wherein the third lens unit is composed of a biconvex positive lens, the air spacing, a biconcave negative lens, the air spacing, and a positive lens in which an image-side surface is greater in curvature than an object-side surface.

5. A zoom optical system according to claim 1, wherein the second lens unit is moved along a locus that is convex toward an image side within a variable magnification region between a wide-angle position and a telephoto position, and the first lens unit is moved so as to be located in an object-side position at the telephoto position with respect to at the wide-angle position.

6. A zoom optical system according to claim 1, wherein the fourth lens unit includes a single positive lens element and is moved along an optical axis to thereby perform focusing.

7. A zoom optical system according to claim 1, further satisfying the following condition:

$$1.8 < (Tt - Tw)/fw < 6$$

where fw is a focal length of the zoom optical system at a wide-angle position, Tt is a total length of the zoom optical system at a telephoto position, and Tw is a total length of the zoom optical system at the wide-angle position, the total length of the zoom optical system being a distance from a first surface of the zoom optical system to an image plane.

8. A zoom optical system according to claim 7, further satisfying the following condition:

$$3.4 < (Tt - Tw)/fw < 5.$$

9. A zoom optical system according to claim 1, further satisfying the following condition $$1.5 < (en30/fw) < 5$$

where en30 is a position of an entrance pupil relative to an angle of view of 30° at a wide-angle position and fw is a focal length of the zoom optical system at the wide-angle position.

10. A zoom optical system according to claim 9, further satisfying the following condition:

$$2<(en30/fw)<4.$$

11. A zoom optical system according to claim 9, further satisfying the following condition:

$$0.9<(en35/en30)<1.15$$

where en35 is the position of the entrance pupil relative to an angle of view of 35° at the wide-angle position.

12. A zoom optical system according to claim 1, wherein the object-side surface of the first negative lens is configured as an aspherical surface, satisfying the following condition:

$$0<\Phi L1/\Phi H1<1.3$$

where $\Phi L1$ is an amount of deviation, measured along an optical axis, from a reference spherical surface to the aspherical surface at a diameter −0.30 times a focal length of the second lens unit and $\Phi H1$ is an amount of deviation, measured along the optical axis, from the reference spherical surface to the aspherical surface at a diameter −0.75 times the focal length of the second lens unit, the reference spherical surface being a spherical surface which contacts with a vertex of the aspherical surface and has a radius identical to a radius of curvature of the aspherical surface, measured along the optical axis.

13. A zoom optical system according to claim 1, wherein the aperture stop is placed on the object side of the third lens unit.

14. A zoom optical system according to claim 13, wherein the aperture stop and the second lens unit are moved individually.

15. A zoom optical system according to claim 14, wherein the aperture stop is moved integrally with the third lens unit.

16. A zoom optical system according to claim 1, wherein the third lens unit is always moved toward the object side upon zooming from a wide-angle position to a telephoto position.

17. A zoom optical system according to claim 1, wherein upon zooming from a wide-angle position to a telephoto position, a spacing between the first lens unit and the second lens unit is widened, a spacing between the second lens unit and the third lens unit is narrowed, a spacing between the third lens unit and the fourth lens unit is widened, and the third lens unit is moved so as to be located in an object-side position at the telephoto position with respect to at the wide-angle position, satisfying the following condition:

$$0.4<\Delta 13/fw<1.2$$

where fw is a focal length of the zoom optical system at the wide-angle position and $\Delta 13$ is an amount of change of the spacing between the first lens unit and the third lens unit at the telephoto position relative to the wide-angle position.

18. A zoom optical system according to claim 1, wherein the second lens unit is moved along a locus that is convex toward the image side so as to be located in an object-side position at a telephoto position with respect to at a wide-angle position, the first lens unit is moved so as to be located in an object-side position at the telephoto position with respect to at the wide-angle position, and the following condition is satisfied:

$$0.6<ST/(Tt-Tw)<1.1$$

where Tt is a total length of the zoom optical system at the telephoto position, Tw is a total length of the zoom optical system at the wide-angle position, ST is an amount of movement of the first lens unit ranging from in the vicinity of an intermediate focal length state to the telephoto position.

19. A zoom optical system according to claim 18, wherein the first lens unit satisfies the following condition:

$$0.2<(Tt-Tw)/Tw<0.8.$$

20. A zoom optical system according to claim 1, wherein a spacing between an entrance surface and an exit surface of the first lens unit is filled with an optical material.

21. A zoom optical system according to claim 20, wherein the first lens unit is a cemented lens of a negative lens and a positive lens.

22. A zoom optical system according to claim 1, wherein the second lens unit consists of three single lenses.

23. An imaging apparatus comprising an optical system according to claim 1.

24. A zoom optical system comprising, in order from an object side:
a first lens unit with positive refracting power;
a second lens unit with negative refracting power;
a third lens unit with positive refracting power; and
a fourth lens unit with positive refracting power,
an aperture stop being interposed between the second lens unit and the fourth lens unit,
at least, the first lens unit, the second lens unit, and the third lens unit being moved upon zooming so that spacings between individual lens units are varied,
the first lens unit being composed of at most two lens elements,
the second lens unit including, in order from the object side:
a first negative lens in which an image-side surface is greater in curvature than an object-side surface;
an air spacing;
a second negative lens in which an image-side surface is greater in curvature than an object-side surface;
an air spacing; and
a positive lens in which an object-side surface is greater in curvature than an image-side surface,
the second negative lens satisfying the following condition:

$$-0.7<f2/R23<0.05$$

where R23 is a radius of curvature of the object-side surface of the second negative lens and f2 is a focal length of the second lens unit,
wherein the fourth lens unit includes a single positive lens element and is moved along an optical axis to thereby perform focusing.

25. A zoom optical system comprising, in order from an object side:
a first lens unit with positive refracting power;
a second lens unit with negative refracting power;
a third lens unit with positive refracting power; and
a fourth lens unit with positive refracting power;
an aperture stop being interposed between the second lens unit and the fourth lens unit,
at least, the first lens unit, the second lens unit, and the third lens unit being moved upon zooming so that spacings between individual lens units are varied,
the first lens unit being composed of at most two lens elements,
the second lens unit including, in order from the object side:
a first negative lens in which an image-side surface is greater in curvature than an object-side surface;

an air spacing;
a second negative lens in which an image-side surface is greater in curvature than an object-side surface;
an air spacing; and
a positive lens in which an object-side surface is greater in curvature than an imageside surface,
the second negative lens satisfying the following condition:

$-0.7 < f2/R23 < 0.05$ where R23 is a radius of curvature of the object-side surface of the second negative lens and f2 is a focal length of the second lens unit,
wherein the zoom optical system further satisfies the following condition:

$1.8 < (Tt-Tw)/fw < 6$ where fw is a focal length of the zoom optical system at a wide-angle position, Tt is a total length of the zoom optical system at a telephoto position, and Tw is a total length of the zoom optical system at the wide-angle position, the total length of the zoom optical system being a distance from a first surface of the zoom optical system to an image plane.

26. A zoom optical system according to claim 25, further satisfying the following condition:

$3.4 < (Tt-Tw)/fw < 5$.

27. A zoom optical system comprising, in order from an object side:
a first lens unit with positive refracting power;
a second lens unit with negative refracting power;
a third lens unit with positive refracting power; and
a fourth lens unit with positive refracting power,
an aperture stop being interposed between the second lens unit and the fourth lens unit,
at least, the first lens unit, the second lens unit, and the third lens unit being moved upon zooming so that spacings between individual lens units are varied,
the first lens unit being composed of at most two lens elements,
the second lens unit including, in order from the object side:
a first negative lens in which an image-side surface is greater in curvature than an object-side surface;
an air spacing;
a second negative lens in which an image-side surface is greater in curvature than an object-side surface;
an air spacing; and
a positive lens in which an object-side surface is greater in curvature than an imageside surface,
the second negative lens satisfying the following condition:

$-0.7 < f2/R23 < 0.05$ where R23 is a radius of curvature of the object-side surface of the second negative lens and f2 is a focal length of the second lens unit,
wherein the zoom optical system further satisfies the following condition:

$1.5 < (en30/fw) < 5$ where en30 is a position of an entrance pupil relative to an angle of view of 30° at a wide-angle position and fw is a focal length of the zoom optical system at the wide-angle position.

28. A zoom optical system according to claim 27, further satisfying the following condition:

$2 < (en30/fw) < 4$.

29. A zoom optical system according to claim 27, further satisfying the following condition:

$0.9 < (en35/en30) < 1.15$ where en35 is a position of the entrance pupil relative to an angle of view of 35° at the wide-angle position.

30. A zoom optical system comprising, in order from an object side:
a first lens unit with positive refracting power;
a second lens unit with negative refracting power;
a third lens unit with positive refracting power; and
a fourth lens unit with positive refracting power,
an aperture stop interposed between the second lens unit and the fourth lens unit,
at least, the first lens unit, the second lens unit, and the third lens unit being moved upon zooming so that spacings between individual lens units are varied,
the first lens unit being composed of at most two lens elements,
the second lens unit including, in order from the object side:
a first negative lens in which an image-side surface is greater in curvature than an object-side surface;
an air spacing;
a second negative lens in which an image-side surface is greater in curvature than an object-side surface;
an air spacing; and
a positive lens in which an object-side surface is greater in curvature than an image-side surface,
the second negative lens satisfying the following condition:

$-0.7 < f2/R23 < 0.05$ where R23 is a radius of curvature of the object-side surface of the second negative lens and f2 is a focal length of the second lens unit,
wherein the object-side surface of the first negative lens is configured as an aspherical surface and satisfies the following condition:

$0 < \Phi L1/\Phi H1 < 1.3$ where $\Phi L1$ is an amount of deviation, measured along an optical axis, from a reference spherical surface to the aspherical surface at a diameter −0.30 times a focal length of the second lens unit and $\Phi H1$ is an amount of deviation, measured along the optical axis, from the reference spherical surface to the aspherical surface at a diameter −0.75 times the focal length of the second lens unit, the reference spherical surface being a spherical surface which contacts with a vertex of the aspherical surface and has a radius identical to a radius of curvature of the aspherical surface, measured along the optical axis.

31. A zoom optical system comprising, in order from an object side:
a first lens unit with positive refracting power;
a second lens unit with negative refracting power;
a third lens unit with positive refracting power; and
a fourth lens unit with positive refracting power,
an aperture stop being interposed between the second lens unit and the fourth lens unit,
at least, the first lens unit, the second lens unit, and the third lens unit being moved upon zooming so that spacings between individual lens units are varied, the first lens unit being composed of at most two lens elements, the second lens unit including, in order from the object side:
- a first negative lens in which an image-side surface is greater in curvature than an object-side surface;
- an air spacing;
- a second negative lens in which an image-side surface is greater in curvature than an object-side surface;
- an air spacing; and
- a positive lens in which an object-side surface is greater in curvature than an imageside surface, the second negative lens satisfying the following condition:

$-0.7 < f2/R23 < 0.05$ where R23 is a radius of curvature of the object-side surface of the second negative lens and f2 is a focal length of the second lens unit,
wherein the second lens unit is moved along a locus that is convex toward the image side so as to be located in an object-side position at a telephoto position with respect to at a wide-angle position, the first lens unit is moved so as to be located in an object-side position at the telephoto position with respect to at the wide-angle position, and the following condition is satisfied:

$0.6 < ST/(Tt-Tw) < 1.1$ where Tt is a total length of the zoom optical system at the telephoto position, Tw is a total length of the zoom optical system at the wide-angle position, ST is an amount of movement of the first lens unit ranging from in the vicinity of an intermediate focal length state to the telephoto position.

32. A zoom optical system according to claim 31, wherein the first lens unit satisfies the following condition:

$0.2 < (Tt-Tw)/Tw < 0.8$.

33. A zoom optical system comprising, in order from an object side:
- a first lens unit with positive refracting power;
- a second lens unit with negative refracting power;
- a third lens unit with positive refracting power; and
- a fourth lens unit with positive refracting power,
- an aperture stop being interposed between the second lens unit and the fourth lens unit,
- at least, the first lens unit, the second lens unit, and the third lens unit being moved upon zooming so that spacings between individual lens units are varied,
- the first lens unit being composed of at most two lens elements,
- the second lens unit including, in order from the object side:
  - a first negative lens in which an image-side surface is greater in curvature than an object-side surface;
  - an air spacing;
  - a second negative lens in which an image-side surface is greater in curvature than an object-side surface;
  - an air spacing; and
  - a positive lens in which an object-side surface is greater in curvature than an image-side surface,
- the second negative lens satisfying the following condition:

$-0.7 < f2/R23 < 0.05$ where R23 is a radius of curvature of the object-side surface of the second negative lens and f2 is a focal length of the second lens unit,
wherein a spacing between an entrance surface and an exit surface of the first lens unit is filled with an optical material and the first lens unit is a cemented lens of a negative lens and a positive lens.

34. A zoom optical system comprising, in order from an object side:
- a first lens unit with positive refracting power;
- a second lens unit with negative refracting power;
- a third lens unit with positive refracting power; and
- a fourth lens unit with positive refracting power,
- an aperture stop being interposed between the second lens unit and the fourth lens unit,
- at least, the first lens unit, the second lens unit, and the third lens unit being moved upon zooming so that spacings between individual lens units are varied,
- the first lens unit being composed of at most two lens elements,
- the second lens unit including, in order from the object side:
  - a first negative lens in which an image-side surface is greater in curvature than an object-side surface;
  - an air spacing;
  - a second negative lens in which an image-side surface is greater in curvature than an object-side surface;
  - an air spacing; and
  - a positive lens in which an object-side surface is greater in curvature than an image-side surface,
- the second negative lens satisfying the following condition:

$-0.7 < f2/R23 < 0.05$ where R23 is a radius of curvature of the object-side surface of the second negative lens and f2 is a focal length of the second lens unit,
wherein the third lens unit consists of a positive single lens, a negative single lens, and a positive single lens arranged with air spacings therebetween.

35. A zoom optical system comprising, in order from an object side:
- a first lens unit with positive refracting power;
- a second lens unit with negative refracting power;
- a third lens unit with positive refracting power; and
- a fourth lens unit with positive refracting power,
- an aperture stop being interposed between the second lens unit and the fourth lens unit,
- at least, the first lens unit, the second lens unit, and the third lens unit being moved upon zooming so that spacings between individual lens units are varied,
- the first lens unit being composed of at most two lens elements,
- the second lens unit including, in order from the object side:
  - a first negative lens in which an image-side surface is greater in curvature than an object-side surface;
  - an air spacing;
  - a second negative lens in which an image-side surface is greater in curvature than an object-side surface;
  - an air spacing; and
  - a positive lens in which an object-side surface is greater in curvature than an image-side surface, the second negative lens satisfying the following condition:

$$-0.7 < f2/R23 < 0.05$$

where R23 is a radius of curvature of the object-side surface of the second negative lens and f2 is a focal length of the second lens unit, wherein the third lens unit is composed of a biconvex positive lens, an air spacing, a biconcave negative lens, an air spacing, and a positive lens in which an image-side surface is greater in curvature than an object-side surface.

* * * * *